(12) United States Patent
Willis et al.

(10) Patent No.: US 6,505,785 B2
(45) Date of Patent: Jan. 14, 2003

(54) METHOD AND MEANS FOR MOUNTING A WIND TURBINE ON A TOWER

(75) Inventors: Jeffrey O. Willis, Blair, NE (US); Anthony J. Hansen, Elkhorn, NE (US); Mark J. Perina, Omaha, NE (US)

(73) Assignee: Valmont Industries, Inc., Valley, NE (US)

(*) Notice: Subject to any disclaimer, the term of this patent is extended or adjusted under 35 U.S.C. 154(b) by 0 days.

(21) Appl. No.: 09/932,506

(22) Filed: Aug. 17, 2001

(65) Prior Publication Data

US 2002/0047277 A1 Apr. 25, 2002

Related U.S. Application Data

(63) Continuation-in-part of application No. 09/563,612, filed on May 2, 2000, now Pat. No. 6,278,198.

(51) Int. Cl.⁷ .................................................. F03D 9/00
(52) U.S. Cl. ............................ 240/55; 182/103; 414/167
(58) Field of Search .......................... 290/55; 414/167; 182/103

(56) References Cited

U.S. PATENT DOCUMENTS

| | | | |
|---|---|---|---|
| 546,710 A | 9/1895 | Rogers | 74/103 |
| 756,216 A | 4/1904 | Crunican | 416/9 |
| 756,616 A | 4/1904 | Fornander | 416/9 |
| 992,067 A | 5/1911 | Sawyers | 416/10 |
| 4,142,830 A | 3/1979 | Schonball | 416/41 |
| 4,217,738 A | 8/1980 | Smith | 52/40 |
| 4,311,434 A | 1/1982 | Abe | 416/142 |
| 4,775,276 A | * 10/1988 | McMillan | 224/309 |
| 4,857,753 A | 8/1989 | Mewburn-Crook et al. | 290/55 |
| 5,649,392 A | 7/1997 | Svenning | 52/66 |
| 6,357,549 B1 | * 3/2002 | Brennan et al. | 182/103 |

FOREIGN PATENT DOCUMENTS

| | | | | |
|---|---|---|---|---|
| DE | 2324843 | * | 12/1974 | |
| DE | 27 35 298 A1 | | 2/1979 | |
| DE | 2742340 A1 | * | 3/1979 | |
| DE | 2823525 B1 | * | 8/1979 | |
| DE | 2861994 G | * | 9/1982 | B29C/27/02 |
| DE | 19647615 A1 | * | 5/1998 | F03D/11/04 |
| GB | 703577 | * | 2/1954 | |
| WO | 82/04466 | | 12/1982 | |

* cited by examiner

*Primary Examiner*—Joseph Waks
(74) *Attorney, Agent, or Firm*—Thomte, Mazour & Niebergall; Dennis L. Thomte

(57) ABSTRACT

The apparatus of this invention is utilized for mounting a wind turbine on the upper end of a wind turbine tower. The invention also relates to the method of erecting the same. The tower is provided with a pair of guide rails positioned on opposite sides thereof which extend from the lower end to the upper end of the tower. A sled is movably mounted on the guide rails and has a platform mounted thereon which is adapted to support the wind turbine thereon. In one form of the invention, the sled is self-contained in that it has an engine and a winch mounted thereon. In another form of the invention, the winch and engine are mounted on a self-propelled vehicle which is designed to transport the sled from one tower location to another. In another form of the invention, the winch is detachable from the self-propelled vehicle so that the winch may be anchored to the ground. When the wind turbine has been positioned at the upper end of the tower, a horizontally slidable platform moves the wind turbine from the sled to the upper end of the tower so that the wind turbine may be secured to the upper end of the tower.

7 Claims, 24 Drawing Sheets

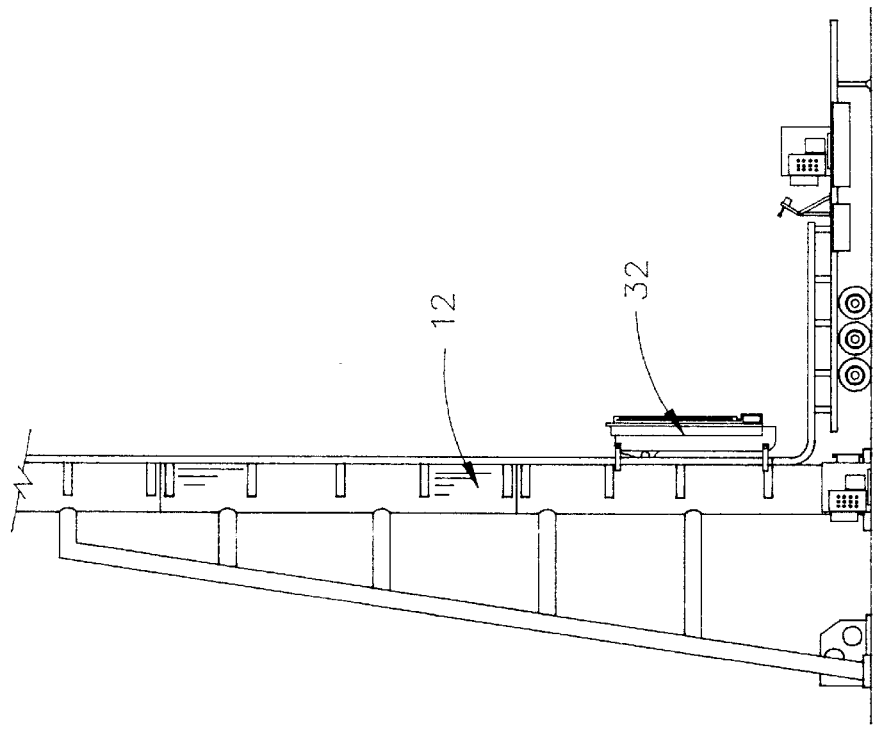
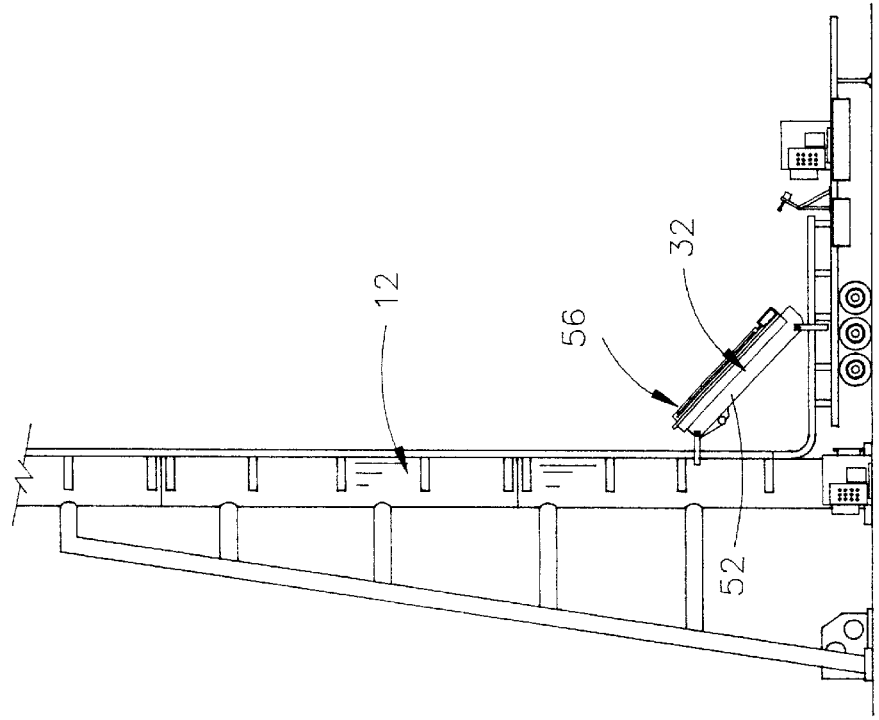

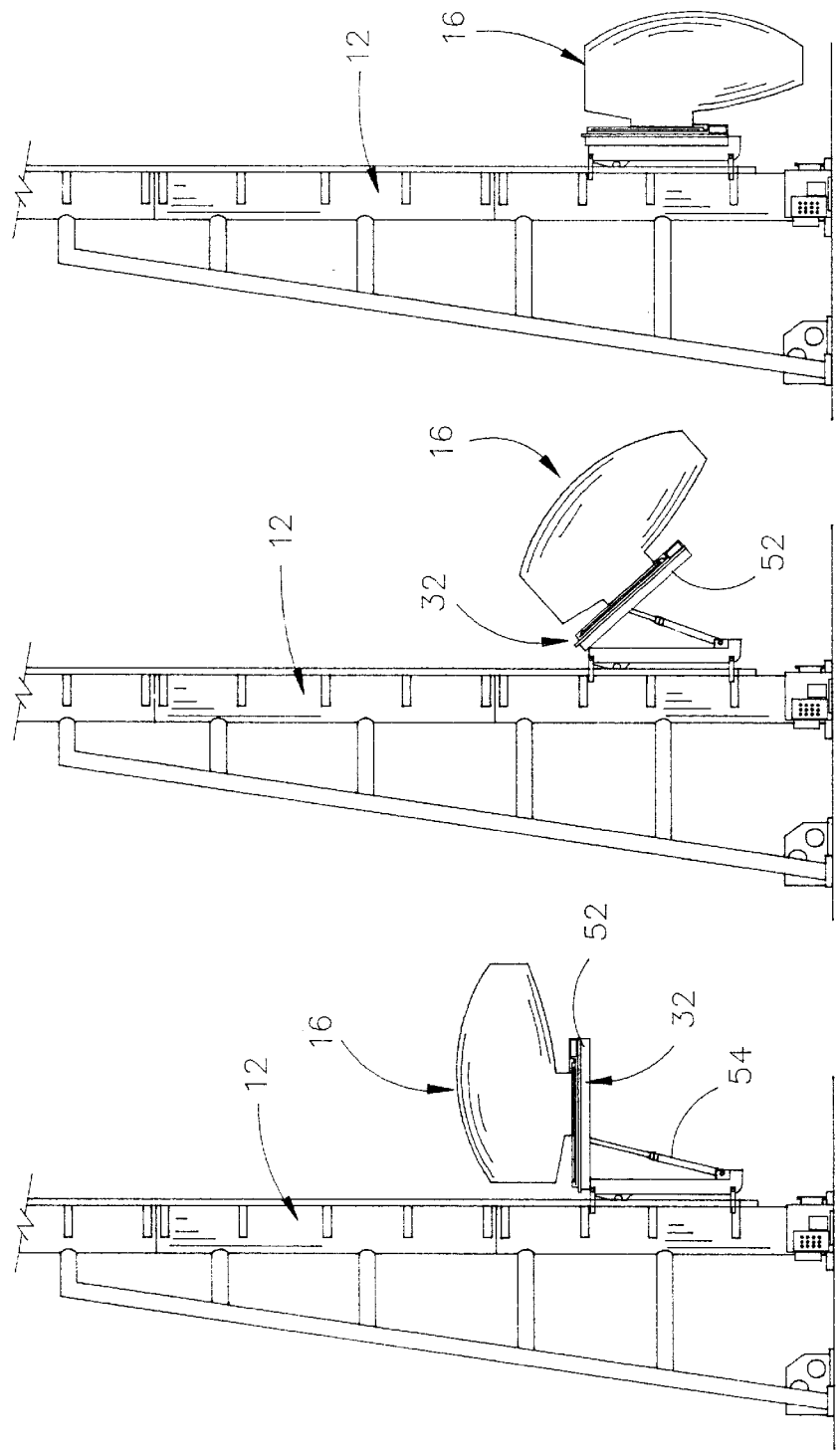

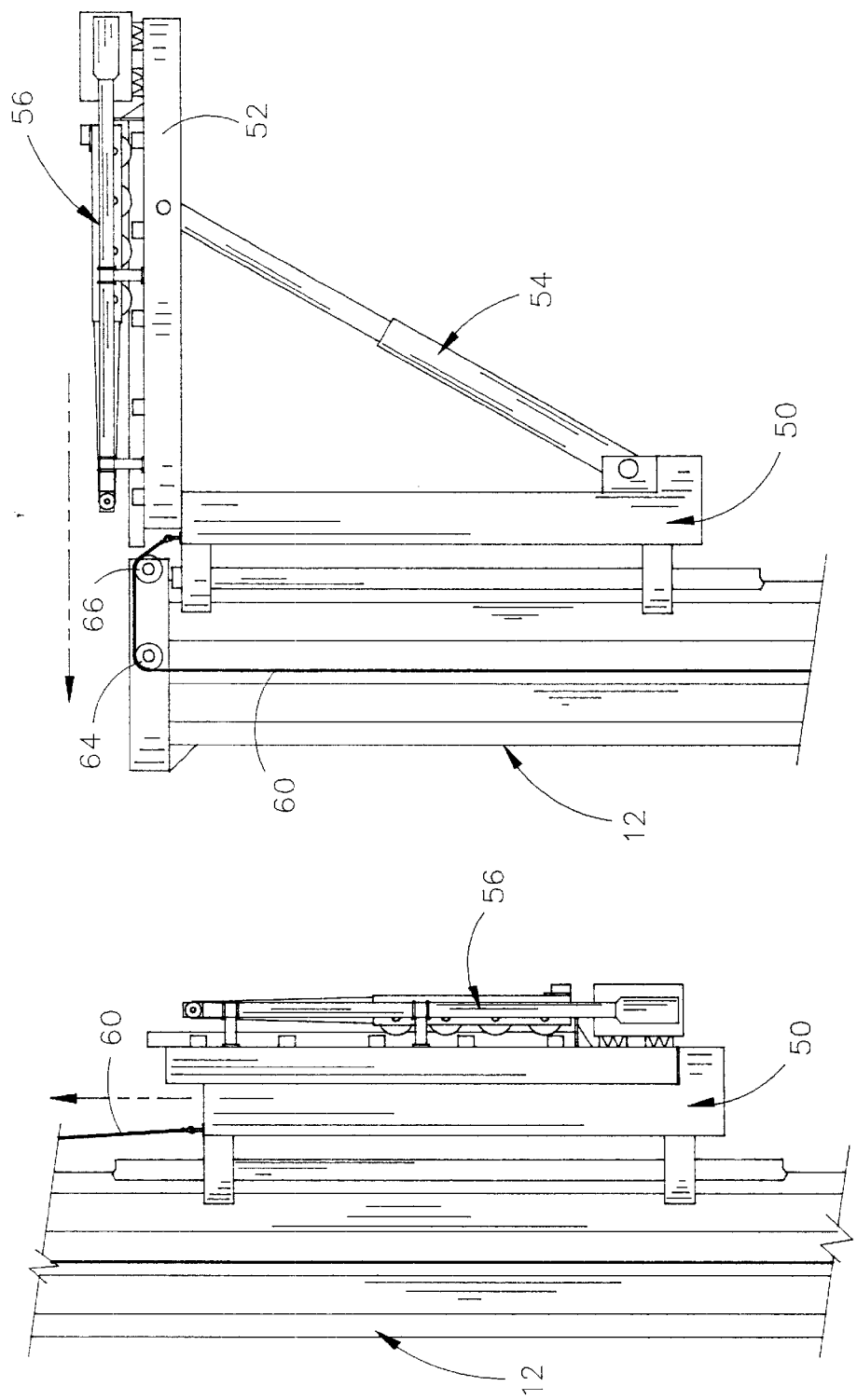

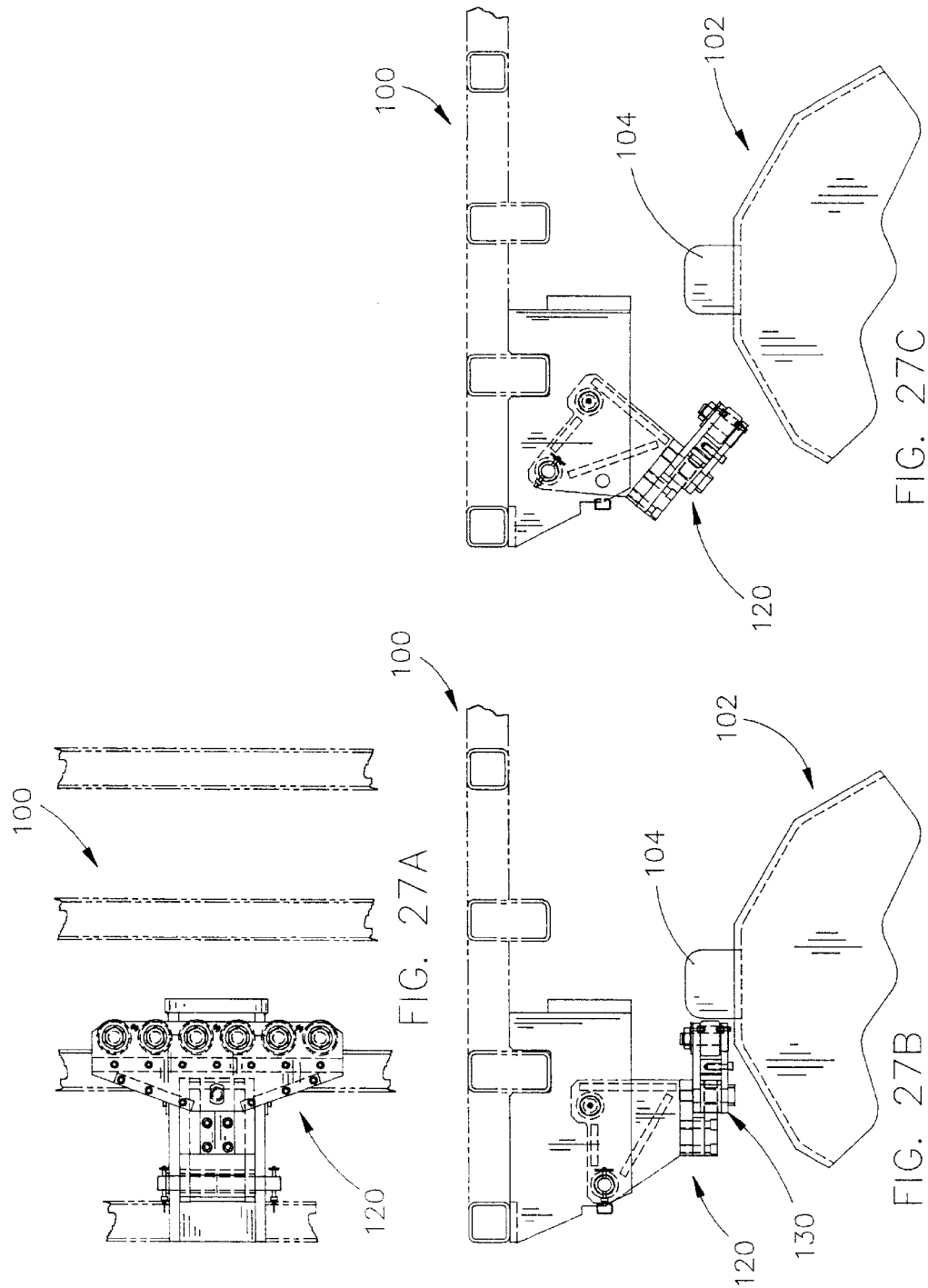

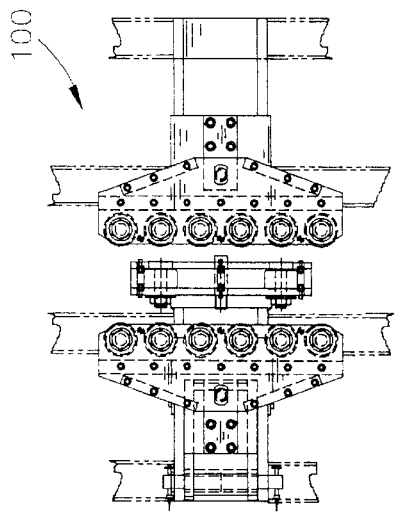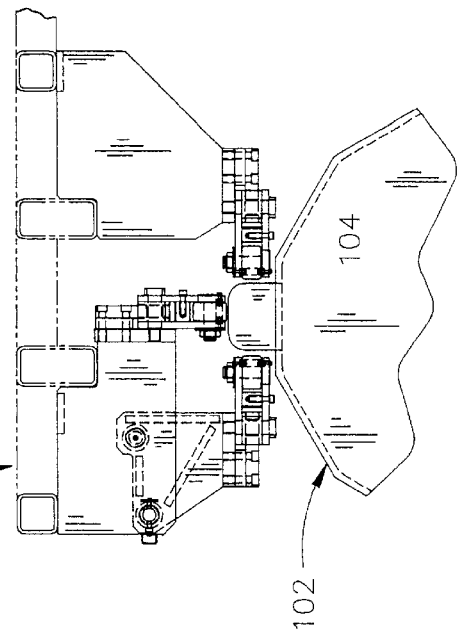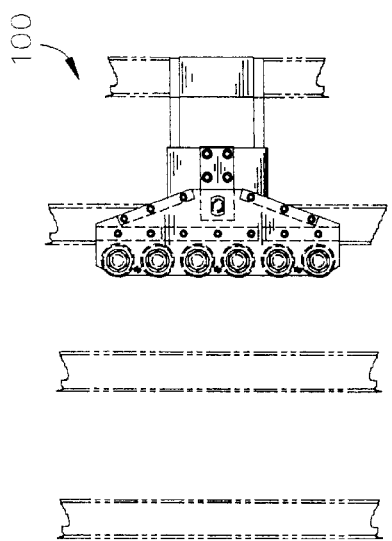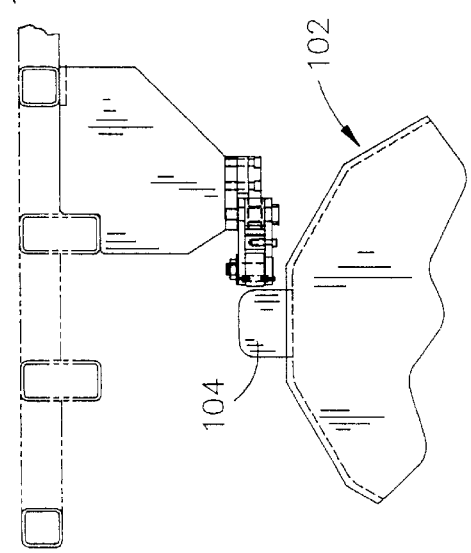

METHOD AND MEANS FOR MOUNTING A WIND TURBINE ON A TOWER

CROSS-REFERENCE TO RELATED APPLICATION

This is a continuation-in-part application of application Ser. No. 09/563,612 filed May 2, 2000, now U.S. Pat. No. 6,278,198 issued Aug. 2, 2001, entitled "METHOD AND MEANS FOR MOUNTING A WIND TURBINE ON A TOWER".

BACKGROUND OF THE INVENTION

1. Field of the Invention

This invention relates to a method and means for mounting a wind turbine on the upper end of a supporting tower and more particularly to a method and means wherein the wind turbine is winched up the length of the tower on a carriage or sled which rolls along a pair of guide rails positioned on opposite sides of the tower.

2. Description of the Related Art

Wind turbines are becoming more popular in the production of electrical energy. The wind turbine assembly normally comprises a rotor-driven generator or turbine mounted atop a tower which may reach heights of 70 meters or more. The tower is normally first erected and the wind turbine is then mounted on the upper end of the tower by means of an extremely large crane. The customary method of mounting the wind turbine on the upper end of the tower is quite expensive in that the extremely large crane used for positioning the wind turbine on the upper end of the tower is very expensive and it is costly to have such a crane on site during the erection procedure. Thus, it is advantageous to be able to mount the wind turbine on the upper end of the tower without the use of the extremely large crane. In the application Ser. No. 09/563,612 filed May 2, 2000, a novel method and means is described for mounting a wind turbine on the upper end of a tower. Although the method and means described in the above-identified application represents a significant advance in the art, the instant invention is believed to be a further advance in the art.

SUMMARY OF THE INVENTION

A method and means for mounting a wind turbine on a vertically disposed tower is disclosed wherein the tower has upper and lower ends with the tower having a pair of guide rails positioned on opposite sides of the tower which extend between the upper and lower ends thereof. A turbine support, carriage or sled is provided which is adapted to have the wind turbine mounted thereon. The sled is initially removably supported on a self-propelled vehicle which has a winch mounted thereon which is preferably driven by the engine of the vehicle. The vehicle is initially positioned with respect to the tower so that the sled may be transferred from the vehicle to the lower end of the guide rails. In one embodiment of the invention, the vehicle is anchored to the ground or to a suitable foundation. The winch cable of the winch is then connected to a block and tackle assembly which is secured to the upper end of the tower and to the sled. The winch is then operated so that the sled is moved upwardly on the pair of guide rails. When the sled has been raised to a predetermined height with respect to the ground, a small crane positions the wind turbine on the sled at which time the rotor blades may be mounted on the wind turbine if the rotor blades have not been previously mounted thereon. The winch is then operated to raise the sled to the upper end of the tower. When the sled reaches the upper end of the tower, the wind turbine is slidably moved horizontally onto the upper end of the tower at which time the wind turbine is detached from the sled and is securely fastened to the upper end of the tower. The sled is then moved to the lower end of the tower and is removed from the guide rails and repositioned on the vehicle so that the sled may be used for the erection of other wind turbine assemblies. Prior to moving the vehicle to the next tower, the anchoring means is disconnected. In an alternate form of the invention, after the vehicle has maneuvered the sled into position to enable the sled to be transferred from the sled to the guide rails on the tower, the winch is disconnected from the sled and is anchored to the ground or to a suitable foundation. In yet another embodiment of the invention, the sled has an engine and a winch mounted thereon for movement therewith.

It is therefore a principal object of the invention to provide an improved method of erecting a wind turbine assembly.

A further object of the invention is to provide a method of positioning a wind turbine on the upper end of a wind turbine tower wherein the need of an extremely large crane is eliminated.

Still another object of the invention is to provide a wind turbine assembly wherein the wind turbine tower has a pair of guide rails positioned on opposite sides thereof to enable a sled to be vertically moved upwardly thereon with the sled supporting the wind turbine.

Still another object of the invention is to provide an improved method and means for mounting a wind turbine on a wind turbine tower which is less dangerous than the prior art methods of erecting the same.

Still another object of the invention is to provide a method and means for erecting a wind turbine assembly wherein a self-propelled vehicle is utilized which transports a sled from one tower location to another with the vehicle having a power means and a winch mounted thereon.

Still another object of the invention is to provide a sled of the type described above wherein the power means and winch remain on the sled as the sled is moved between the upper and lower ends of the tower.

Still another object of the invention is to provide a unique vehicle for transporting the wind turbine support sled from one tower location to another.

These and other objects will be apparent to those skilled in the art.

BRIEF DESCRIPTION OF THE DRAWINGS

FIG. 4 is a view similar to FIG. 3B except that the sled is being moved from the trailer to the guide rail;

FIG. 5 is a view similar to FIG. 4 except that the sled has been completely removed from the trailer and has been mounted on the sled;

FIG. 8 is a view similar to FIG. 7 except that it illustrates the turbine positioned on the platform of the sled;

FIG. 9 is a view similar to FIG. 8 except that it illustrates the sled platform and the turbine being moved to a vertically disposed position;

FIG. 10 is a view similar to FIG. 9 except that the sled platform and wind turbine have been moved to a vertically disposed position;

FIG. 23 is a partial side view illustrating the sled platform in a vertically disposed position;

FIG. 24 is a partial side view illustrating the sled platform having been moved to the upper end of the tower with the broken lines illustrating the movement of a portion of the sled platform towards the upper end of the tower;

FIG. 27A is a side elevational view as seen along lines 27A of FIG. 25;

FIG. 27B is a top view of the structure shown in FIG. 27A;

FIG. 27C is a view similar to FIG. 27B but which illustrates the rail clamping mechanism in an operative position;

FIG. 28A is a side elevational view seen on lines 28A of FIG. 25;

FIG. 29A is a side elevational view as seen along lines 29A of FIG. 25;

FIG. 29B is a partial top view of the structure of FIG. 29A;

FIG. 29C is a view as seen along lines 29A of FIG. 25;

DESCRIPTION OF THE PREFERRED EMBODIMENT

Figures 1, 2:
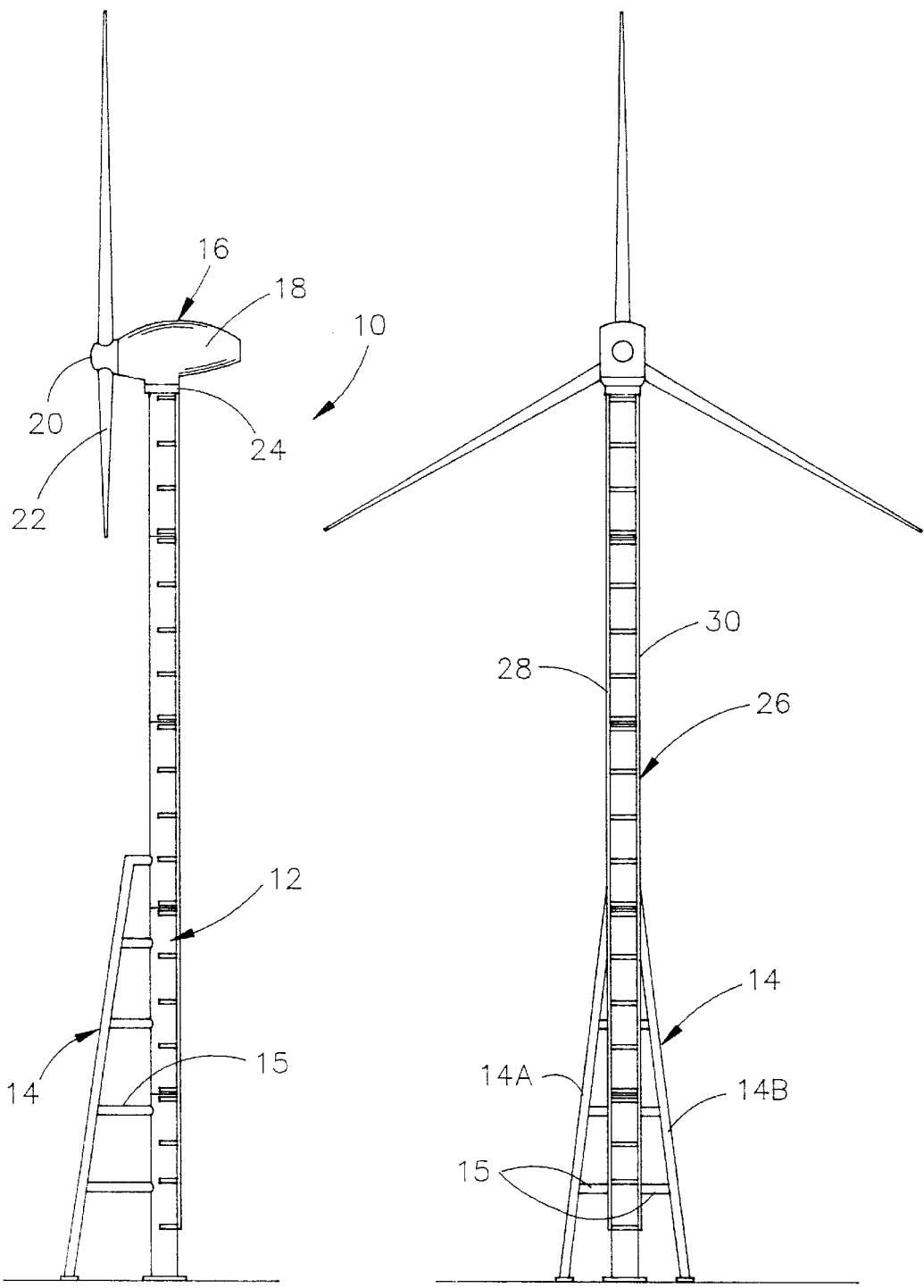
FIG. 1 is a side view of the wind turbine assembly of this invention.
FIG. 2 is a side view of the wind turbine assembly of FIG. 1 as seen from the right of FIG. 1.
Figure 3B:
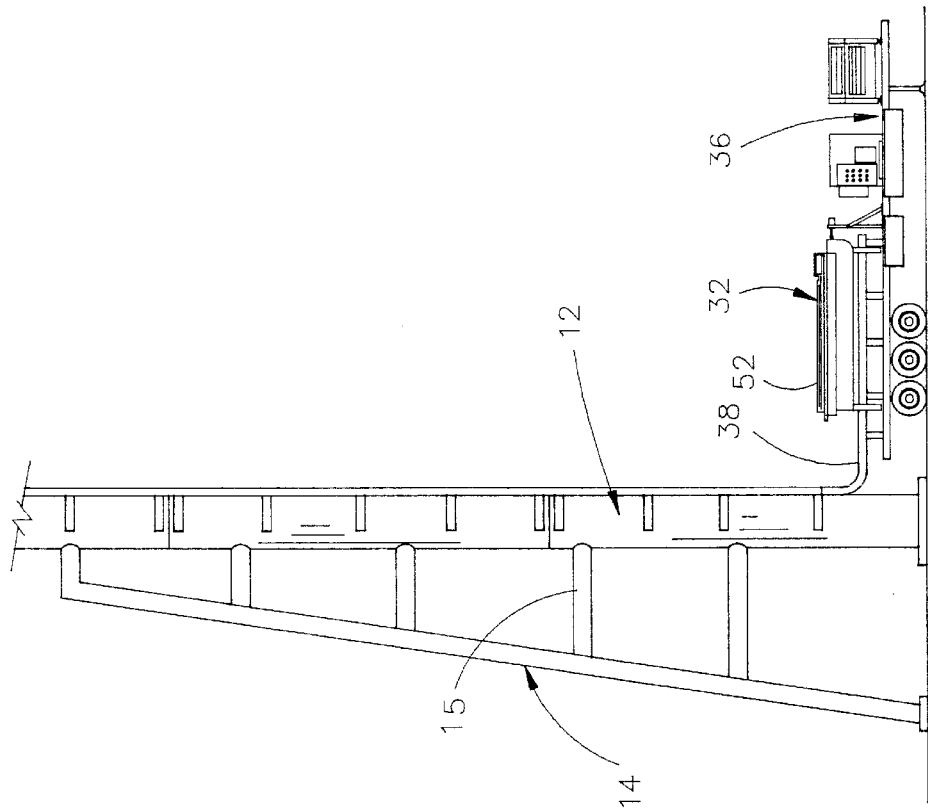
FIG. 3B is a somewhat enlarged partial view of FIG. 3A.
Figure 3A:
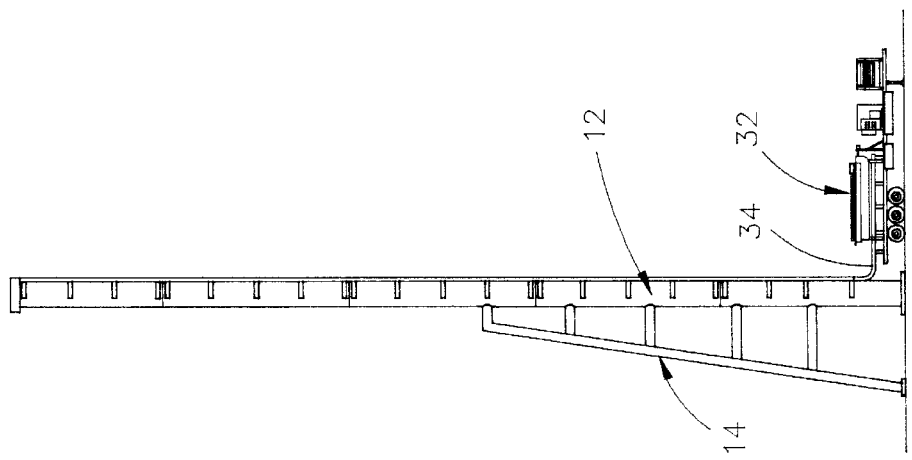
FIG. 3A is a side view of the tower and illustrating the wind turbine support carriage or sled supporting the wind turbine being supported on a trailer at the lower end of the tower.
Figure 6:
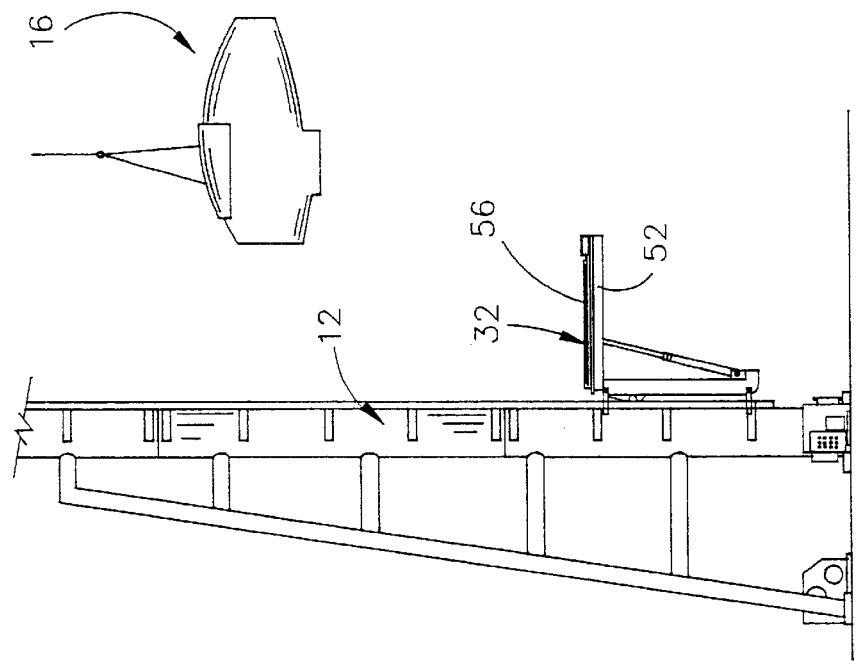
FIG. 6 is a view similar to FIG. 5 except that the platform of the sled is being pivoted to a horizontal position.
Figure 7:
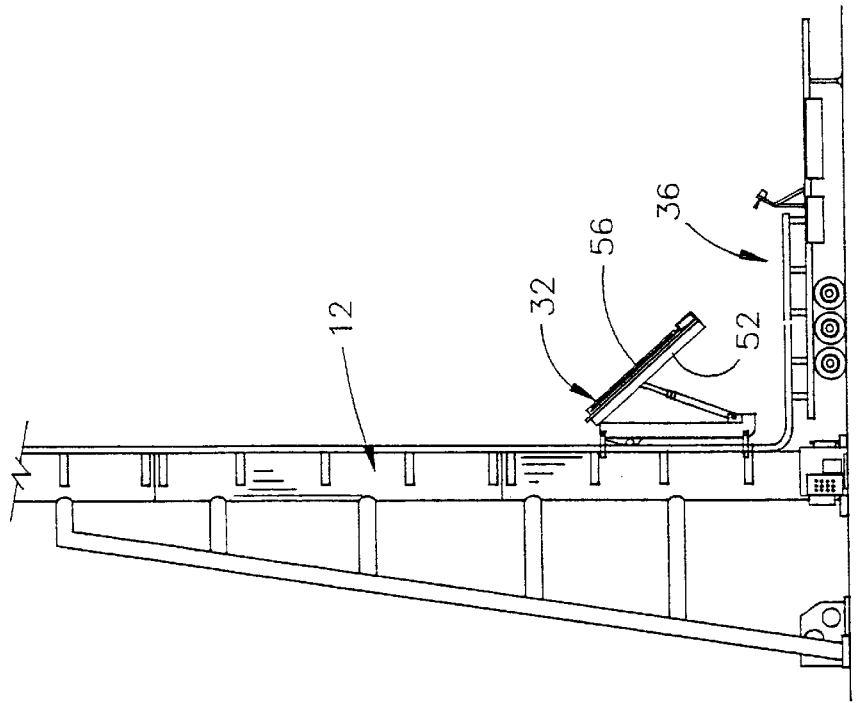
FIG. 7 is a view similar to FIG. 6 except that the platform of the sled has been pivoted to a horizontal position and the wind turbine is being lowered towards the platform.

In one embodiment of the invention (FIGS. 1–24), the wind turbine assembly of this invention is referred to generally by the reference numeral 10 and includes a tower 12 which may have a height of up to seventy meters or more. A support structure 14 in the form of a battered leg structure 14A and 14B is provided at one side of the tower 12 for stability purposes. Legs 14A and 14B are connected to the tower 12 by braces 15. The numeral 16 refers to a conventional wind turbine including a housing 18 which houses various components of the wind turbine 16 such as a cooling system, generator, gearbox, and a main shaft extending therefrom onto which a spinner/hub 20 is mounted including rotor blades 22. The wind turbine 16 includes a conventional base portion 24 which is secured to the upper end of the tower 12. To this point, the wind turbine assembly 10 is generally of conventional prior art construction except for the battered leg structure which stabilizes the tower 12, distributes the load on the tower 12, and enables the tower 12 to be constructed of a lighter weight material.

The tower 12 is provided with a guide rail means 26 which in this case comprises a pair of vertically disposed and horizontally spaced guide rails 28 and 30 positioned at one side of the tower 12 with the guide rails 28 and 30 extending between the lower and upper ends of the tower 12. Although it is preferred that a pair of guide rails 28 and 30 be provided, it is possible that any number of guide rails could be provided, if desired. Further, the guide rails 28 and 30 could be positioned on the opposite sides of the tower 12 and could take shapes other than that disclosed. For example, guide rails could be T-shaped if desired.

The numeral 32 refers generally to a wind turbine support, carriage or sled which is adapted to move along the guide rails 28 and 30 and which includes a platform 52 adapted to have the wind turbine 16 secured thereto and which includes means for pivoting the platform 52 approximately ninety degrees with respect to the sled, as will be described in more detail hereinafter. In this embodiment, the sled 32 is removably positioned on a wheeled frame such as a truck or trailer 36 having a pair of spaced-apart guide rails 38 provided thereon which are adapted to mate with or register with the lower ends of the guide rails 28 and 30 so that the sled 32 may be moved from its position on the wheeled frame means 36 onto the guide rails 28 and 30.

Sled 32 includes a pair of projecting frame members 40 and 42 having recessed portions 44 and 46 formed therein, respectively, which are adapted to receive the guide rails 28 and 30 and which are also adapted to receive the guide rails 38 when the sled 32 is mounted on the wheeled frame means 36. It is preferred that the recessed areas 44 and 46 be provided with a plurality of slides or rollers 48 provided thereon to facilitate the sliding movement of the sled 32 with respect to the guide rails 28 and 30. Generally speaking, sled 32 includes a frame means 50 having the platform 52 pivotally secured thereto and which is movable therewith by means of power cylinder 54 or some other mechanism. It is preferred that a slide mechanism 56 be slidably mounted on platform 52 to enable the slide mechanism 56 to be moved from the position illustrated in FIG. 24 to a position towards tower 12 to enable the turbine 16 to be moved from the carriage to the upper end of the tower 12 as will be more fully described hereinafter. Slide 56 includes means for having the wind turbine 16 selectively secured thereto.

Figure 21:
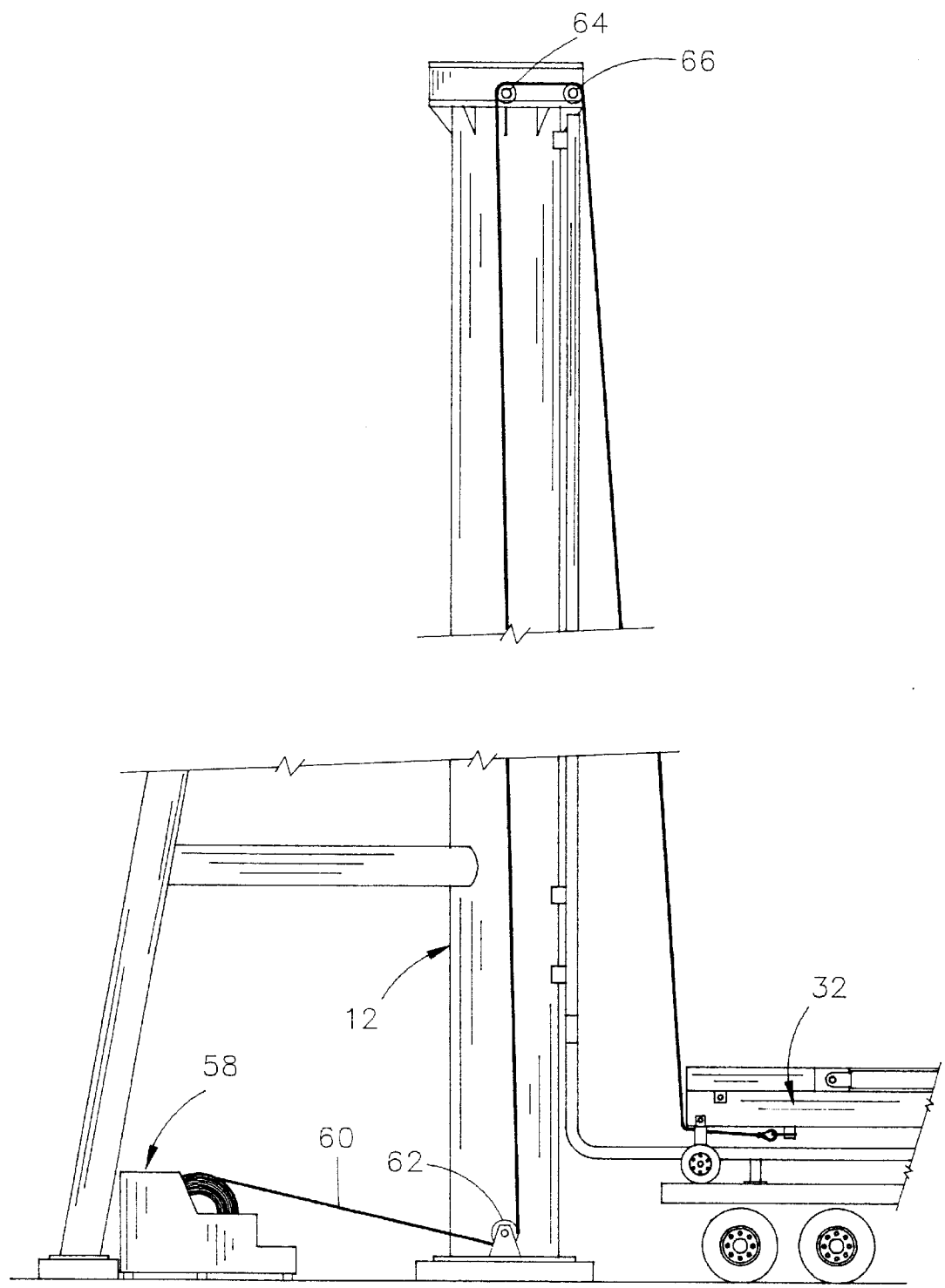
FIG. 21 is a partial side view illustrating the connection of the winch means with the sled while the sled is mounted on a trailer.
Figure 22:
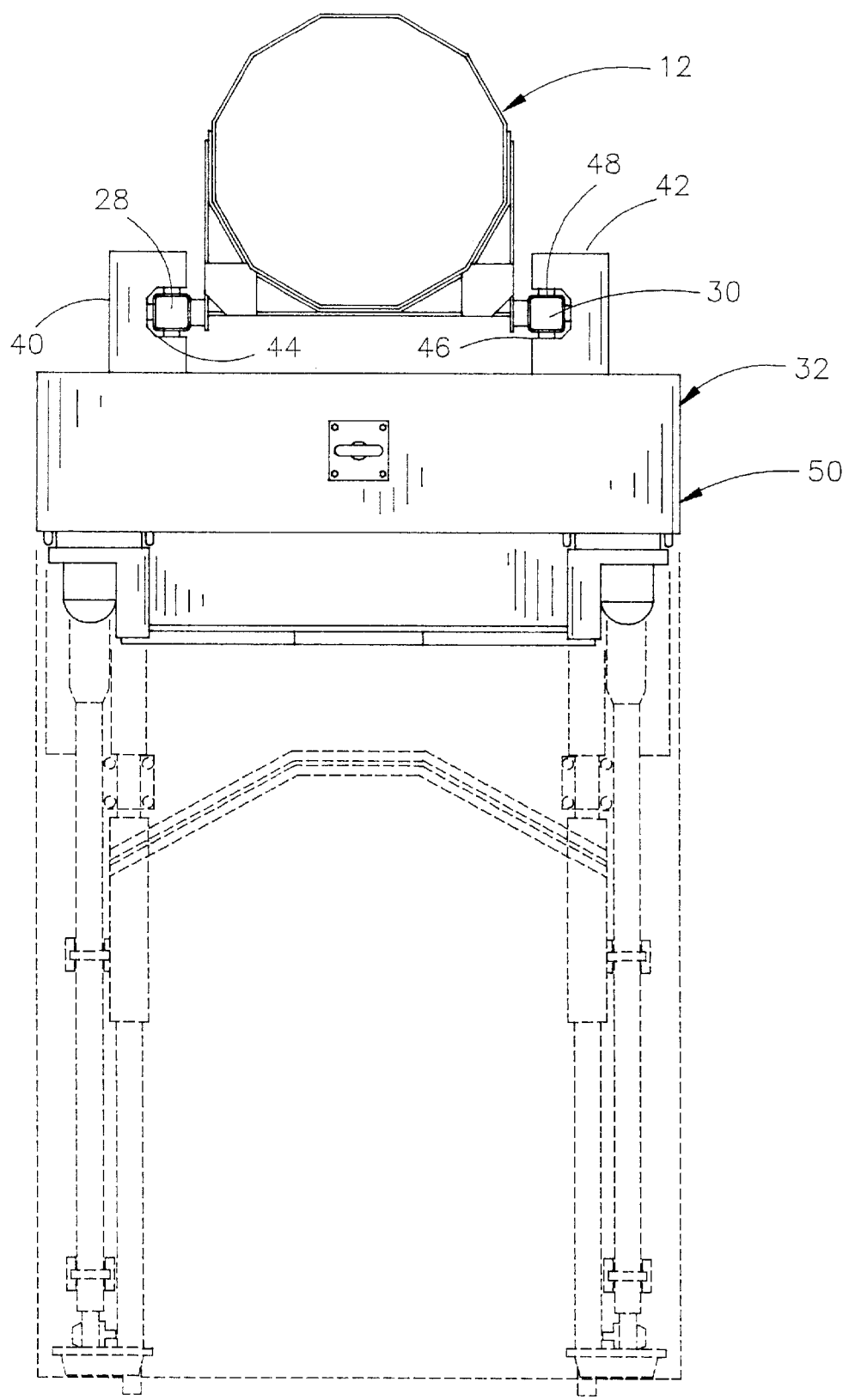
FIG. 22 is a sectional view illustrating the relationship of the tower, guide rail means and sled.

In this embodiment, the numeral 58 refers to a winch which is positioned at the lower end of the tower 12 and which has a winch cable 60 extending therefrom. Winch cable 60 preferably extends around pulley 62 and thence upwardly to the upper end of the tower 12 wherein it extends over pulleys 64 and 66. Winch cable 60 then extends downwardly, as seen in FIG. 21, for connection to the sled 32.

Figure 12:
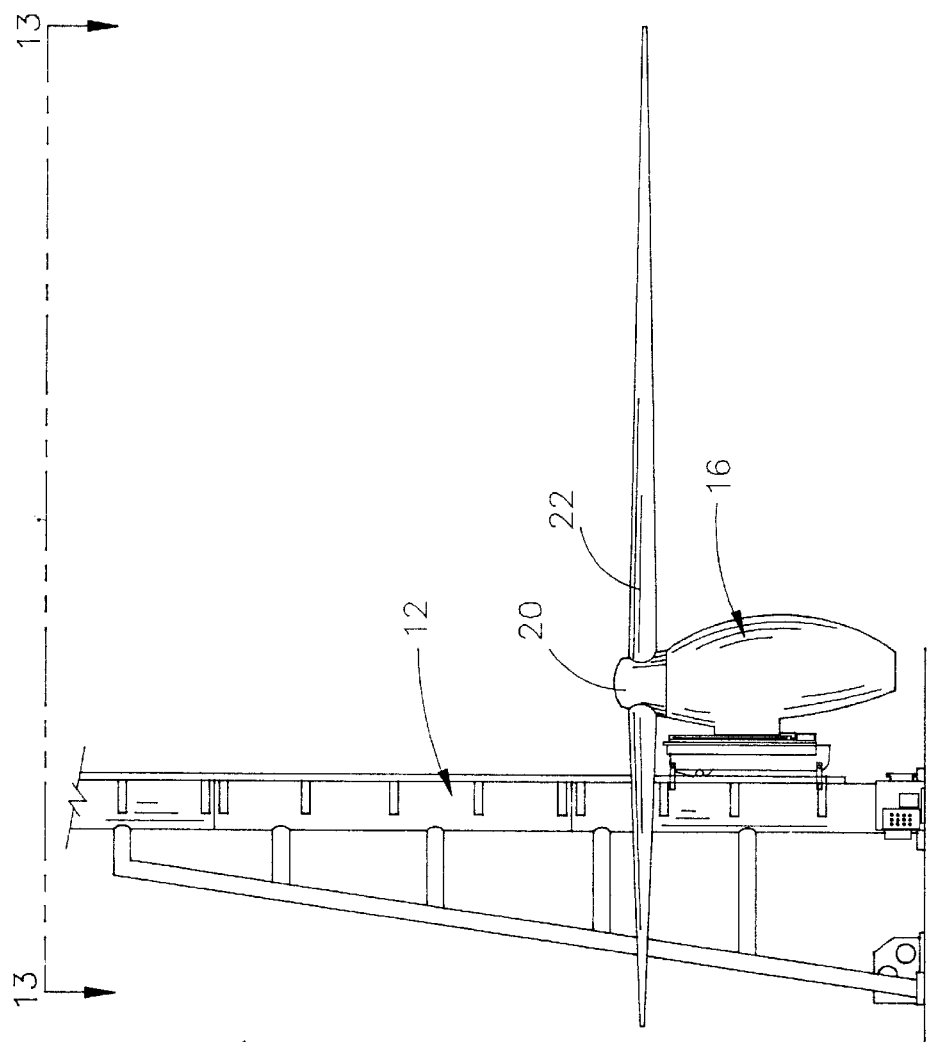
FIG. 12 is a view similar to FIG. 11 except that the spinner/hub and rotor blades have been mounted on the wind turbine.
Figure 11:
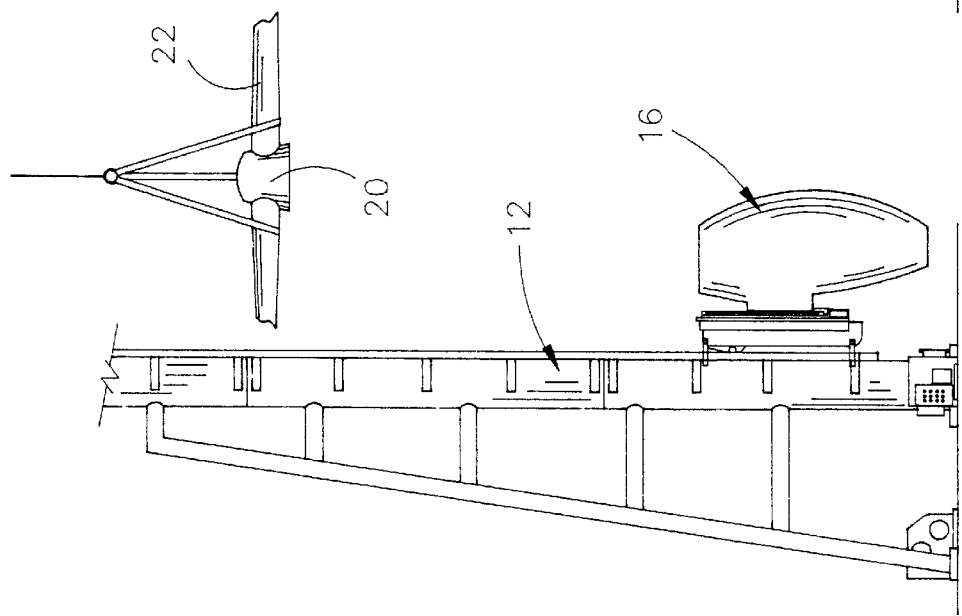
FIG. 11 is a view similar to FIG. 10 but which illustrates the spinner/hub and rotors being lowered towards the wind turbine.
Figure 14:
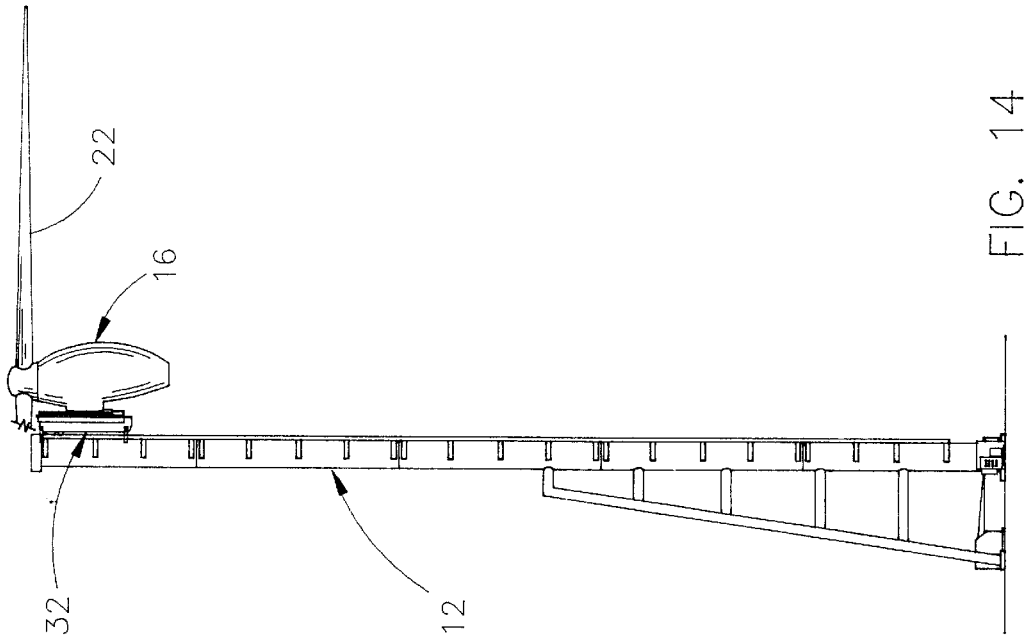
FIG. 14 is a side view illustrating the sled and wind turbine having been moved to the upper end of the tower.
Figure 13:
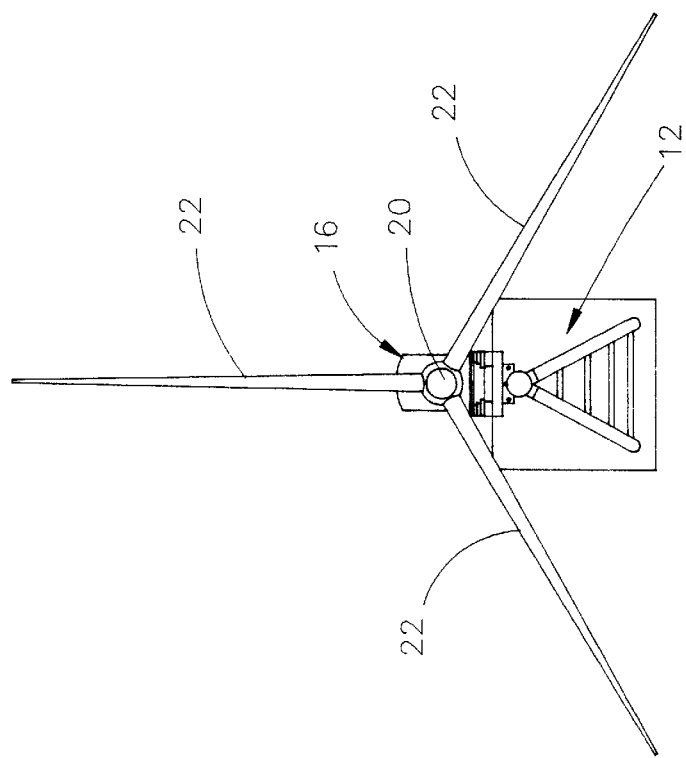
FIG. 13 is a view scene on lines 13—13 of FIG. 12.
Figures 15, 16, 17:
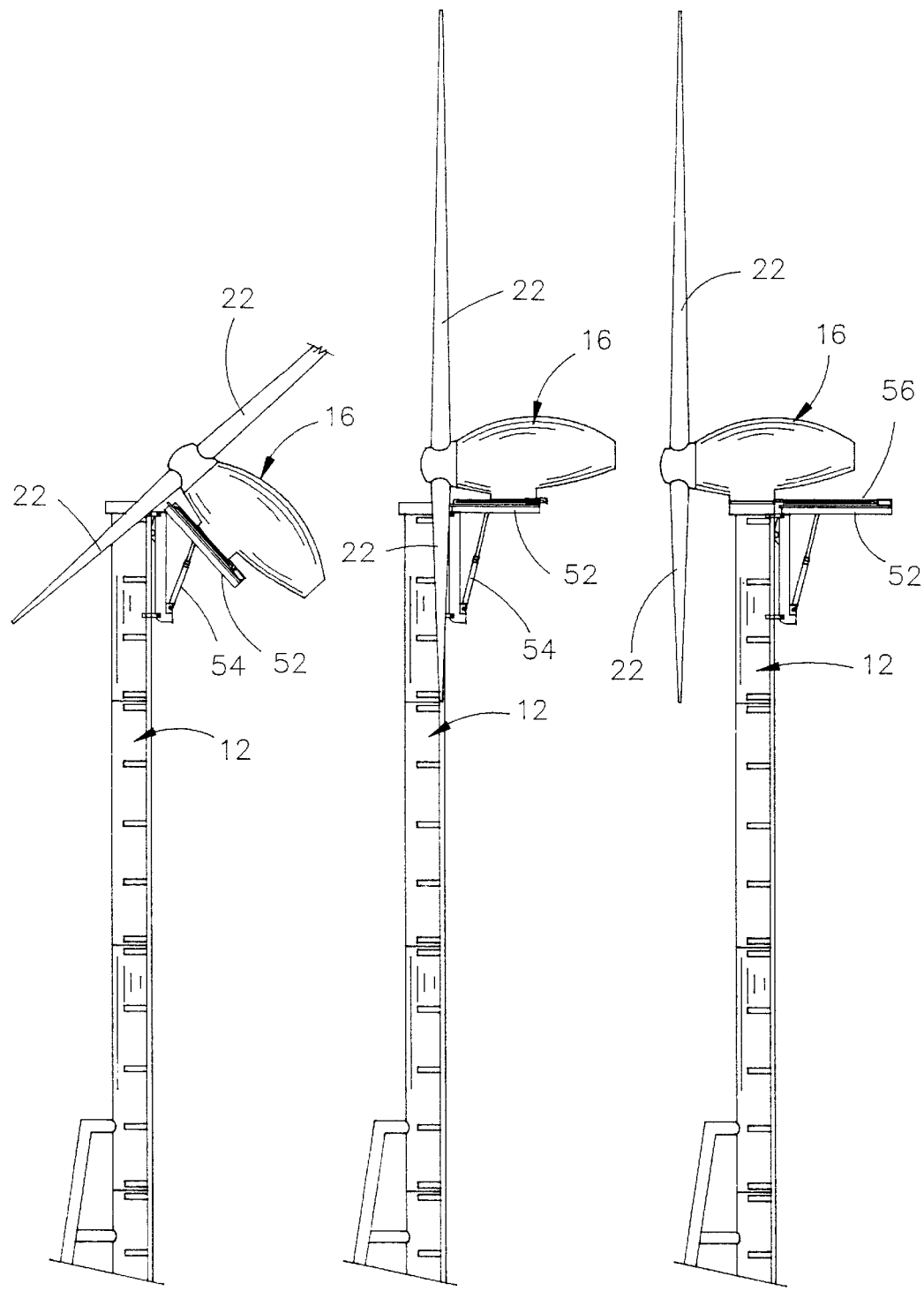
FIG. 15 is a view similar to FIG. 14 except that the sled platform is being pivoted from its vertically disposed position to its horizontal position.
FIG. 16 is a view similar to FIG. 15 except that the sled platform and turbine have been moved to a horizontally disposed position.
FIG. 17 is a view similar to FIG. 16 except that the turbine is illustrated as having been slidably moved from the sled platform to the upper end of the tower.

The tower 12 is first erected in conventional fashion, except for the structure 14, with the guide rails 28 and 30 being provided thereon as previously described. When it is desired to mount the turbine 16 on the upper end of the tower 12, utilizing the embodiment described above, the wheeled frame means 36 is positioned adjacent the lower end of the tower 12 so that the guide rails 38 mate with the lower ends of the guide rails 28 and 30. The winch cable 60 is then connected to the sled 32 and the winch 58 is actuated so that the cable 60 pulls the sled 32 from the wheeled frame means 36 onto the lower ends of the guide rails 28 and 30, as illustrated in FIGS. 4 and 5. When the sled 32 has been positioned on the lower end of the guide rails 28 and 30, as illustrated in FIG. 5, the platform 52 is pivotally moved from the vertically disposed position of FIG. 5 to the position of FIG. 6 and then to the position of FIG. 7. At that time, the wheeled frame means 36 may be moved away from the lower end of the tower 12. When the platform 52 is in the position of FIG. 5, a small crane is then used to lower the wind turbine 16 onto the slide 56 to which it is securely fastened, as illustrated in FIG. 8. The platform 52 is then pivotally moved from the position of FIG. 8 to the position of FIG. 9 and then to the position of FIG. 10 wherein the wind turbine 16 is substantially vertically disposed. When the wind turbine 16 is in the position of FIGS. 10 and 11, the spinner/hub 20 with the rotor blades 22 attached thereto is lowered onto the main shaft of the wind turbine 16 by means of a small crane or the like. It should be noted that the rotor blades 22 may be secured to the spinner/hub 20 after the spinner/hub 20 has been mounted on the wind turbine 16. FIG. 12 illustrates the spinner/hub 20 and the rotor blades 22 mounted on the wind turbine 16. FIG. 13 is a top view illustrating the wind turbine 16 in the position of FIG. 12.

Figure 18:
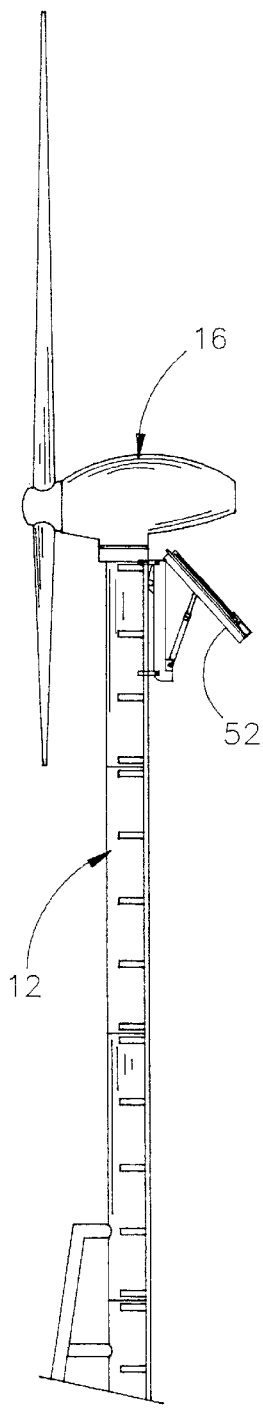
FIG. 18 is a view similar to FIG. 17 except that the sled platform is illustrated as being pivotally moved towards a vertically disposed position.
Figure 19:
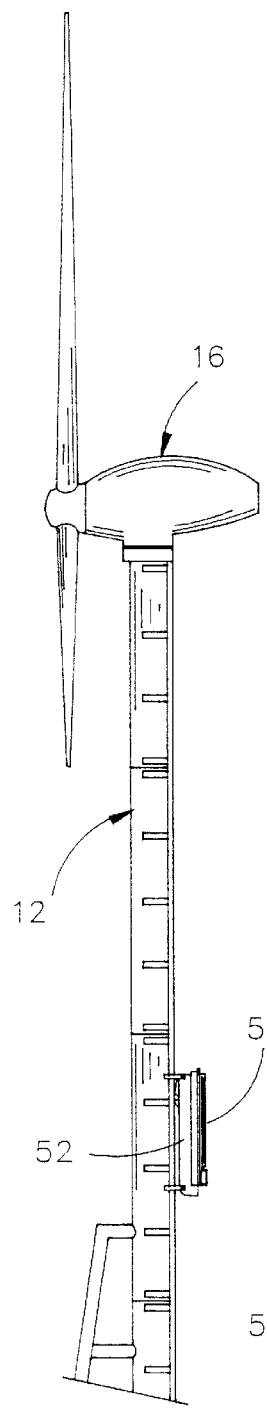
FIG. 19 is a view similar to FIG. 18 except that the sled is illustrated as being lowered towards the ground.
Figure 20:
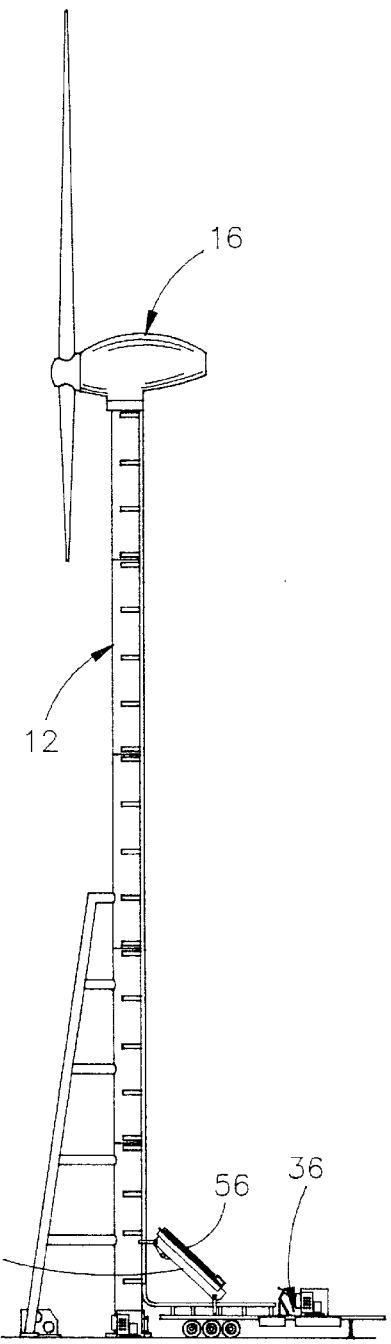
FIG. 20 is a view similar to FIG. 19 except that the sled is being illustrated as being moved onto the trailer.

When the spinner/hub 20 and rotor blades 22 have been mounted on the wind turbine 16, the sled 32 with the wind turbine 16 mounted thereon is winched to the upper end of the tower 12 by means of the winch 58. When the sled 32 has been winched to the position of FIG. 14, the platform 52 is pivotally moved from its vertically disposed position to the position of FIG. 15 and then to the position of FIG. 16. The slide 56 is then moved towards the upper end of the tower 24, as indicated by the dashed arrow in FIG. 24, so that the wind turbine 16 may be removed from the slide 56 and secured to the upper end of the tower 24. When the turbine 16 has been secured to the upper end of the tower 12, as illustrated in FIG. 18, the platform 52 is pivotally moved from its horizontally disposed position to the position of FIG. 18 and then to a vertically disposed position. The sled 32 is then lowered on the guide rails 28 and 30 to the lower end of the tower. The wheeled frame means 36 is then positioned adjacent the lower end of the tower so that the guide rails 38 thereof register once again with the guide rails 28 and 30. The sled 32 is then moved from the guide rails 28 and 30 onto the guide rails 38 of the wheeled frame means 36 so that the sled 32 is positioned on the wheeled frame means 36. The wheeled frame means 36 and the sled 32 may then be moved to another location wherein another wind turbine assembly 10 is to be erected.

The turbine 16 may be installed or mounted on the upper end of the tower in a somewhat different way such as will now be described. As in the previously described method, when it is desired to mount the turbine 16 on the upper end of the tower 12, the wheeled frame means 36 is positioned adjacent the lower end of the tower 12 so that the guide rails 38 mate with the lower ends of the guide rails 28 and 30. The winch cable 60 is then connected to the sled 32 and the winch 58 is actuated so that the cable 60 pulls the sled 32 from the wheeled frame means 36 onto the lower ends of the guide rails 28 and 30. When the sled 32 has been positioned on the lower end of the guide rails 28 and 30, the platform 52 is pivotally moved from the vertically disposed position of FIG. 5 to the position of FIG. 6 and then to the position of FIG. 7. At that time, the wheeled frame means 36 may be moved away from the lower end of the tower 12. When the platform 52 is in the position of FIG. 5, the sled 32 is then winched upwardly along the guide rails 28 and 30 until the carriage has reached a height which is greater than the rotor-swept area. The wind turbine 16 is then positioned on the platform 52 of the sled 32 by means of a small crane with the wind turbine 16 being horizontally disposed and with the main shaft thereof extending laterally from one side of the tower. The spinner/hub 20 with the rotor blades 22 attached thereto are then secured to the main shaft of the wind turbine 16 with the rotor blades being vertically disposed.

When the spinner/hub 20 and the rotor blades 22 have been mounted on the wind turbine 16, the sled 32 with the wind turbine 16 mounted thereon is winched to the upper end of the tower 12 by means of the winch 58. When the sled 32 has been winched to the upper end of the tower, the slide 56 is then moved towards the upper end of the tower 24 so that the wind turbine 16 may be removed from the slide 56 and secured to the upper end of the tower 24. When the turbine 16 has been secured to the upper end of the tower 12, the sled 32 is then lowered on the guide rails 28 and 30 to the lower end of the tower, as in the previously described method.

The advantage of the alternate method is that the wind turbine is always in a horizontally disposed position. In some cases, if the wind turbine was vertically disposed and components of the turbine have been previously filled with lubricating fluids, cooling fluids, etc., some leakage could possibly occur. By maintaining the wind turbine in the horizontally disposed condition, leakage problems are eliminated.

Although in this embodiment the preferred method of moving the wind turbine to the upper end of the tower is with a winch, it is possible that other means could be utilized. For example, some form of ratcheting mechanism could be utilized. A rack and pinion gear arrangement which is motor-driven could also be used.

Thus it can be seen that in this embodiment a novel apparatus has been provided for mounting a wind turbine on the upper end of a wind turbine tower involving the use of a sled which is movably mounted on guide rails provided on the tower and wherein the need for an extremely large crane is eliminated. The relationship of the sled 32 with respect to the guide rails 28 and 30 ensures that undesirable horizontal movement between the sled 32 and the guide rails 28 and 30 will be prevented while permitting the desirable vertical movement of the sled 32 on the guide rails 28 and 30.

Figure 32:
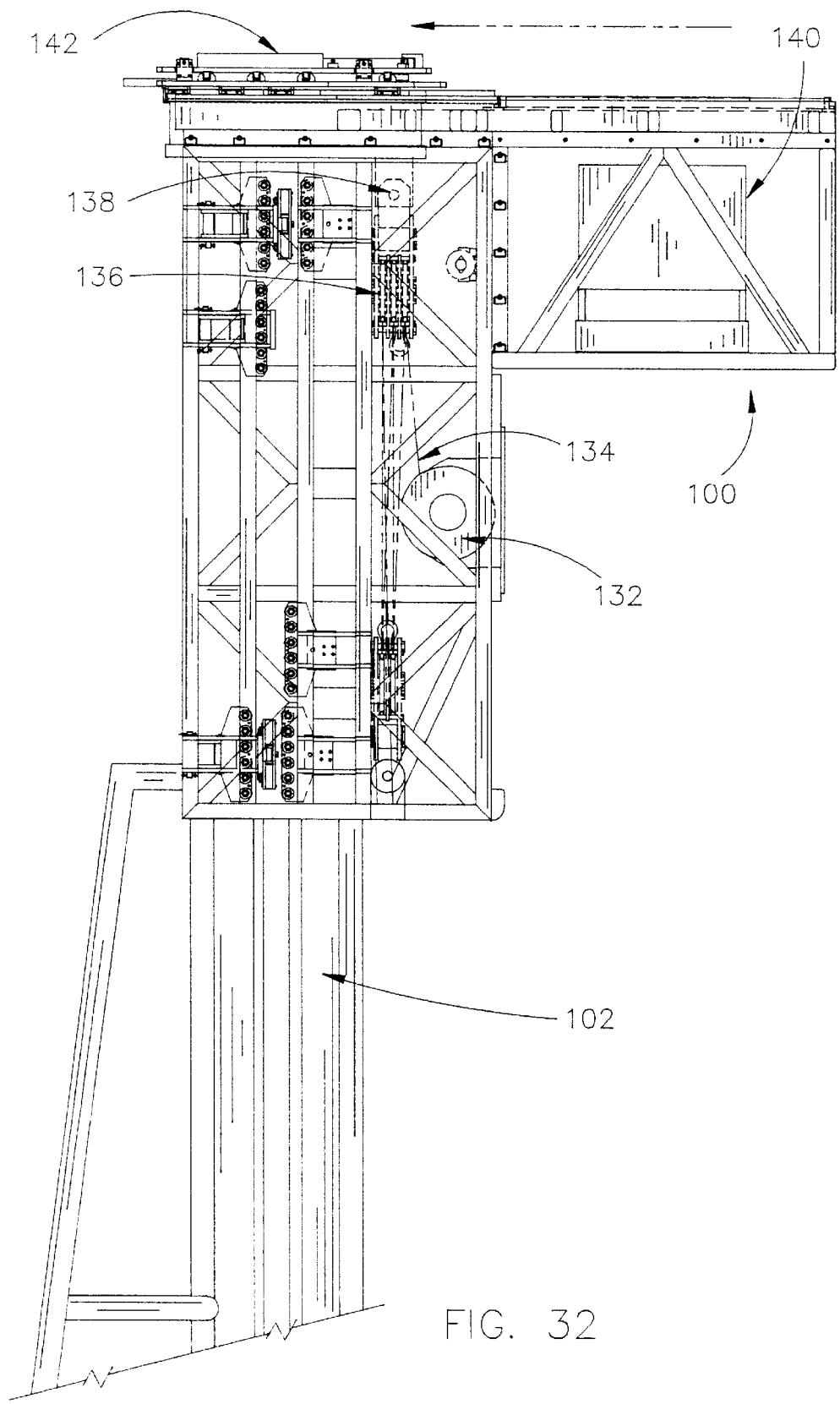
FIG. 32 is a view similar to FIG. 31 except that the sled has been raised to the upper end of the tower.
Figure 33:
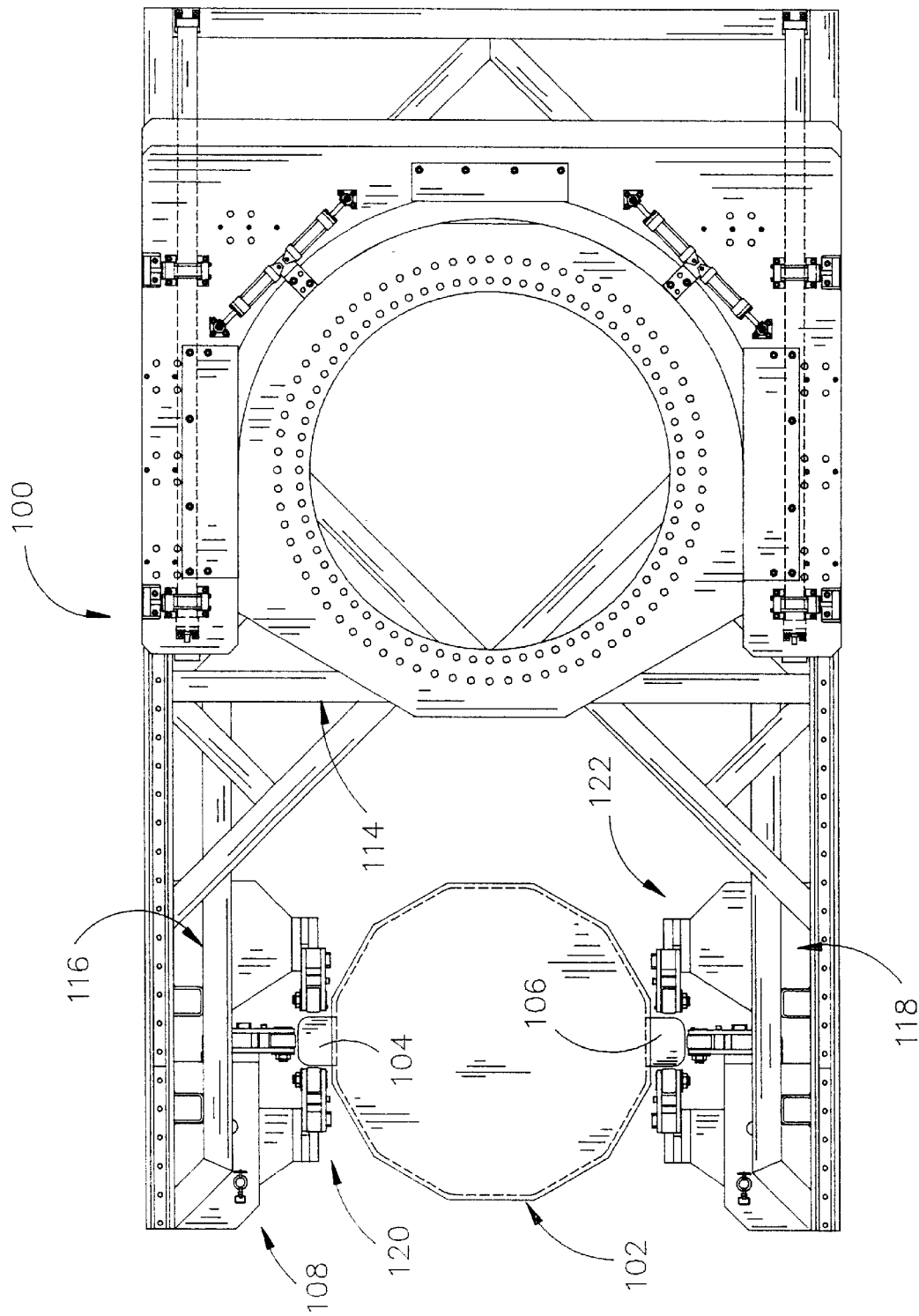
FIG. 33 is a top view of the sled of FIG. 32.
Figure 34:
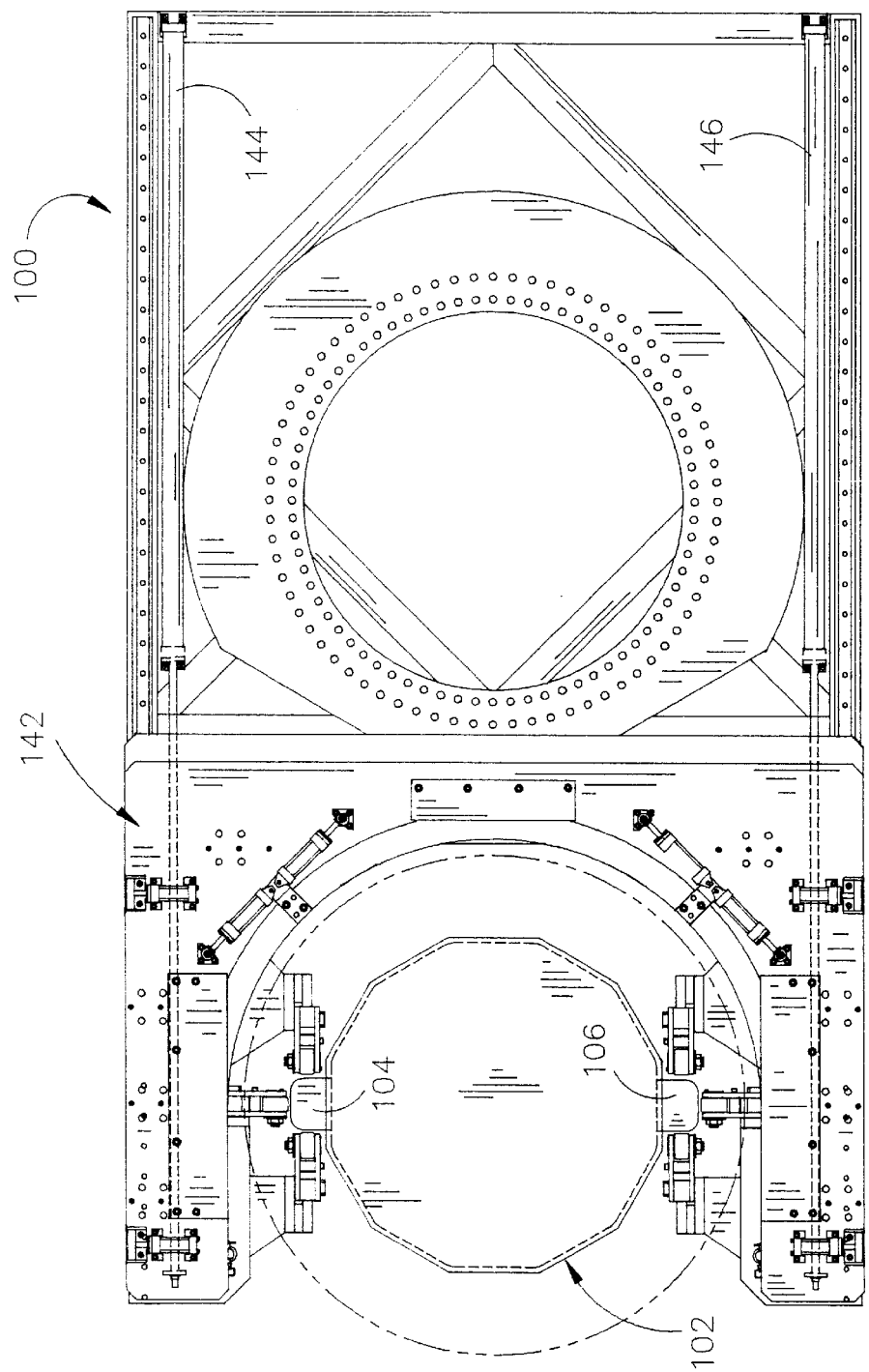
FIG. 34 is a view similar to FIG. 33 except that the turbine platform of the sled has been moved to a position over tower.

In FIGS. 25–34, the numeral 100 refers to a modified form of the wind turbine support, carriage or sled which is used to move the wind turbine from the lower end of the wind turbine tower 102 to the upper end thereof. Tower 102 has a pair of guide rails 104 and 106 positioned on opposite sides thereof which extend between the upper and lower ends thereof. Sled 100 includes a generally U-shaped framework 108 which has an upper end 110 and a lower end 112. The U-shaped framework 108 is adapted to be positioned with respect to the tower 102, as illustrated in FIGS. 25–30. For purposes of description, framework 108 will be described as comprising a base portion 114 having side portions 116 and 118 extending therefrom, as best seen in FIG. 33. Side 116 is provided with a rail clamping apparatus 120 which is positioned on the inner side thereof while side portion 118 is provided with rail clamping apparatus 122 at the inner side thereof. Rail clamping apparatus 120 includes an upper section 120A and a lower section 120B. Similarly, rail clamping apparatus 122 includes an upper section 122A and a lower section 122B. The rail clamping apparatuses 120 and 122 are identical to one another except that they are positioned on opposite sides of the tower 102 for engagement with the guide rails 104 and 106, respectively. Inasmuch as rail clamping apparatuses 120 and 122 are identical, only portions thereof will be described in detail.

Figure 26A:
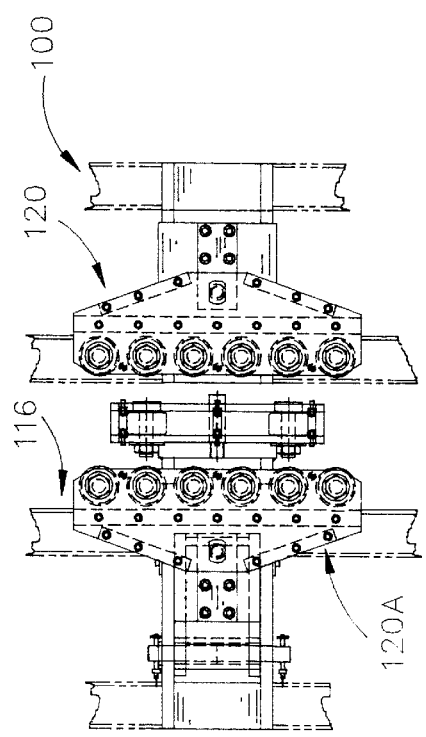
FIG. 26A is a side elevational view as seen along lines 26A of FIG. 25.
Figure 26C:
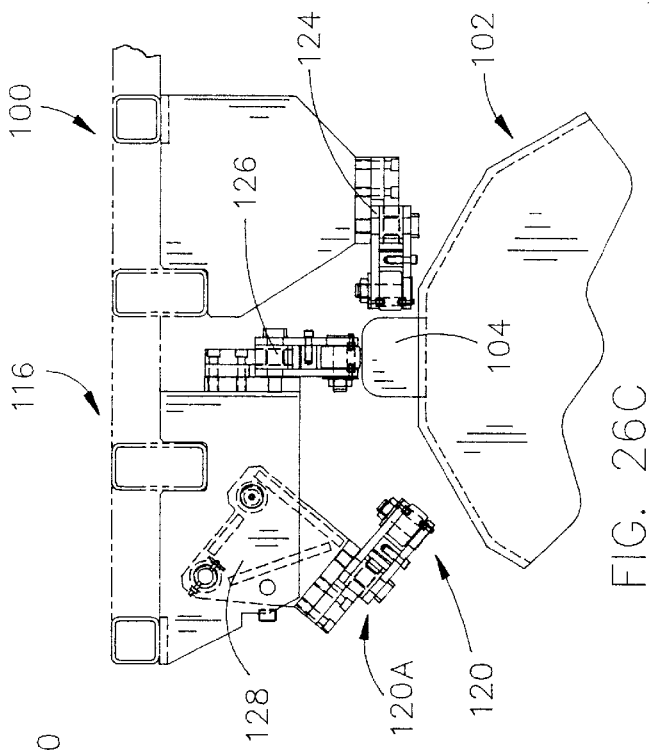
FIG. 26C is a view similar to FIG. 26B except that the rail clamping jaws are illustrated as being in the open position.
Figure 26B:
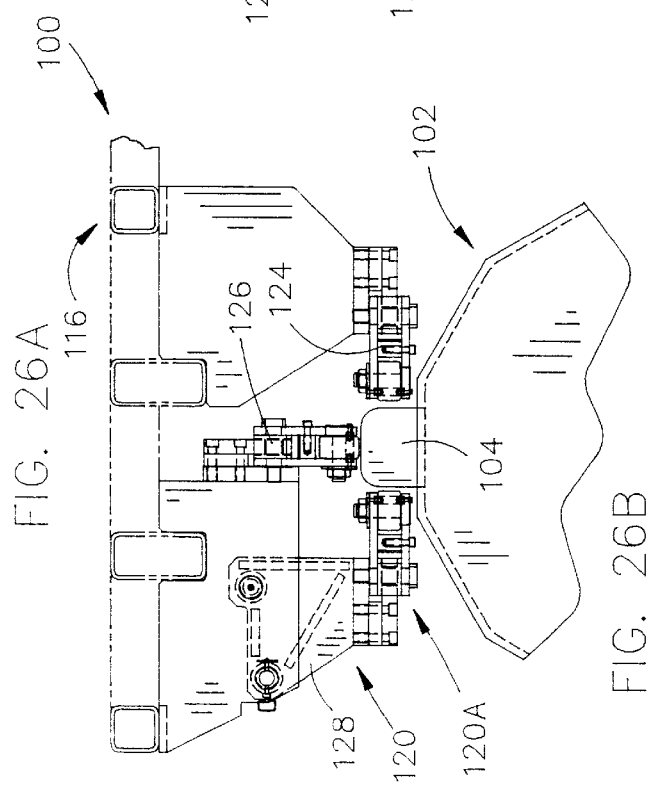
FIG. 26B is a top view of the structure shown in FIG. 26A with the wind turbine tower being partially shown.

Upper section 120A of rail clamping apparatus 120 includes roller assemblies 124 and 126 which are fixed in place with respect to the side portion 116 and which engage the guide rail 104, as seen in FIG. 26B. Upper section 120A of rail clamping apparatus 120 also includes a pivotal roller assembly 128 which may be selectively pivoted from the position of FIG. 26C to the position of FIG. 26B so that the guide rail 104 is clamped between the roller assemblies 124, 126 and 128, as seen in FIG. 26B. Upper section 120A of rail clamping apparatus 120 also includes a roller assembly 130 which is selectively pivotally movable between the positions of FIGS. 27C and 27B to enable the roller assembly to abut one side of the guide rail 104, as seen in FIGS. 27B and 27C. The lower section 120B is identical to the upper section 120A except that the three-sided clamping mechanism, such as seen in FIG. 26B, is located below the one-sided roller assembly illustrated in FIG. 27B. Although the rail clamping apparatus as disclosed in the drawings is the preferred embodiment, other types of rail clamping devices may be utilized as long as the sled is restrained against lateral or horizontal movement with respect to the tower.

Figure 25:
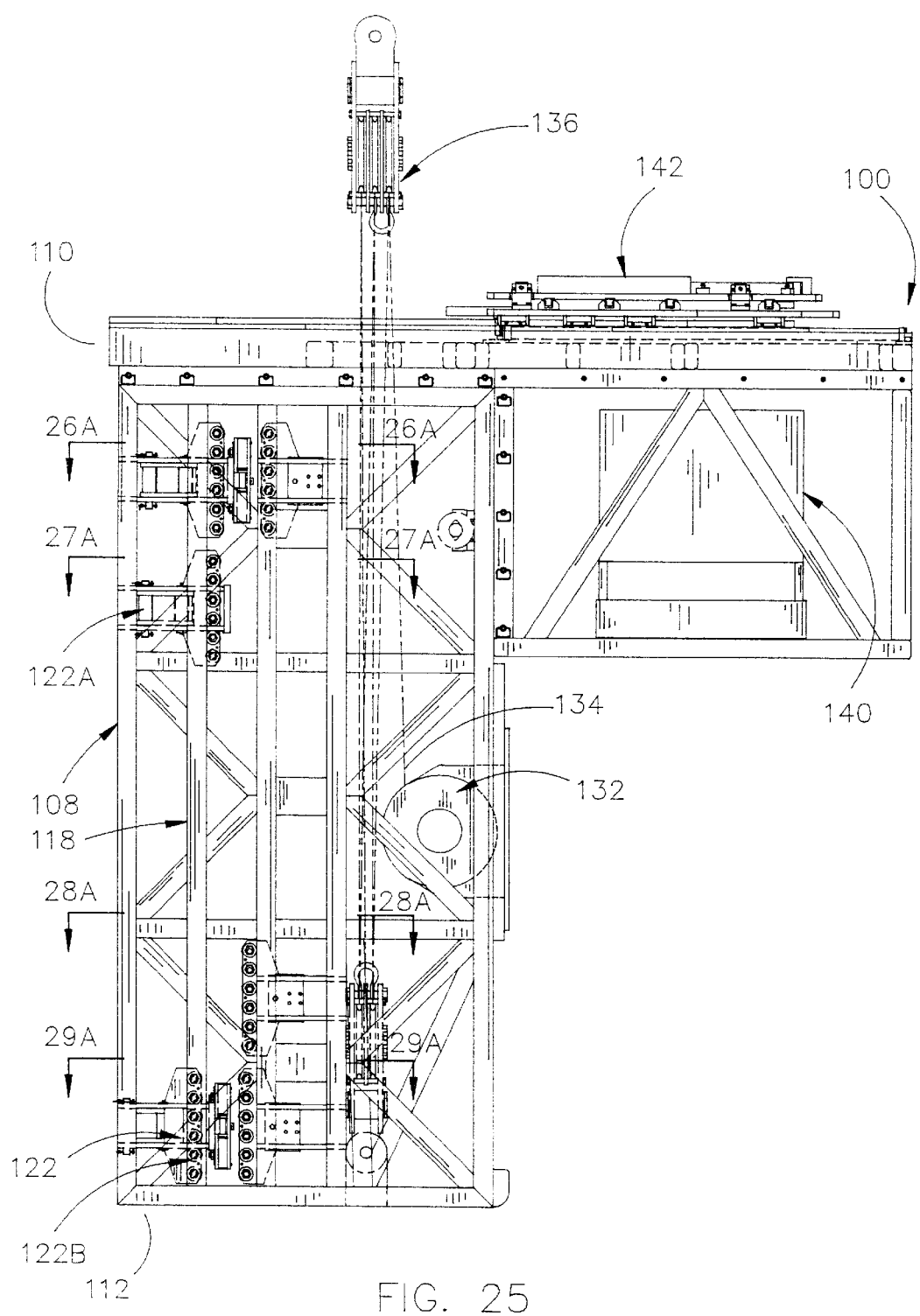
FIG. 25 is a side elevational view of a modified form of the sled.

The sled 100 of FIG. 25 includes a winch 132 mounted thereon having a cable 134 extending therefrom which is associated with a block and tackle assembly 136. The lower end of the block and tackle assembly 136 is anchored to the framework 108 adjacent the lower end thereof, as seen in FIG. 25. The upper end of the block and tackle assembly 136 is detachably connected to the tower 102 at 138. A power means 140, such as internal combustion engine, is mounted on the framework 108, as illustrated in FIG. 25. Power means 140 is operatively connected to the winch 132 in conventional fashion by means of hydraulic hoses or the like so that the winch may be operated to raise and lower the sled 100 with respect to the tower 102. The sled 100 preferably also includes a braking means for engagement with the guide rails 104 and 106 should the sled experience a power failure, winch failure or block and tackle failure.

The numeral 142 refers to a horizontally movable platform which is mounted on the upper end of the sled 100, as illustrated in FIGS. 25, and 30–34. The platform 142 is moved from the position of FIG. 33 to the position of FIG. 34, and vice versa, by means of hydraulic cylinders 144 and 146. Platform 142 is adapted to have the wind turbine mounted thereon and is designed to move the wind turbine from the sled 100 onto the upper end of the tower 102.

Figure 30:
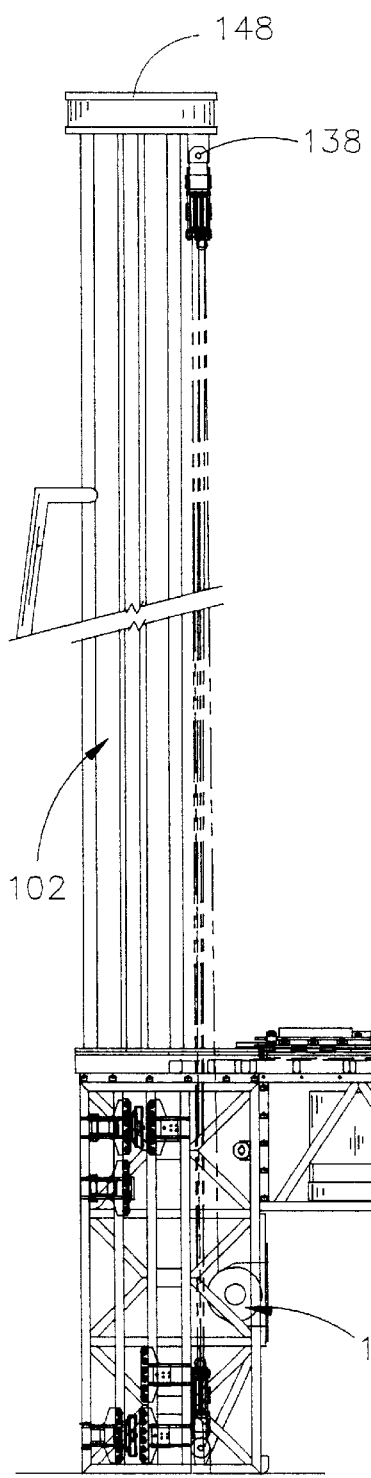
FIG. 30 is a partial side view illustrating the sled of FIG. 25 in its lowermost position with respect to the tower.
Figure 31:
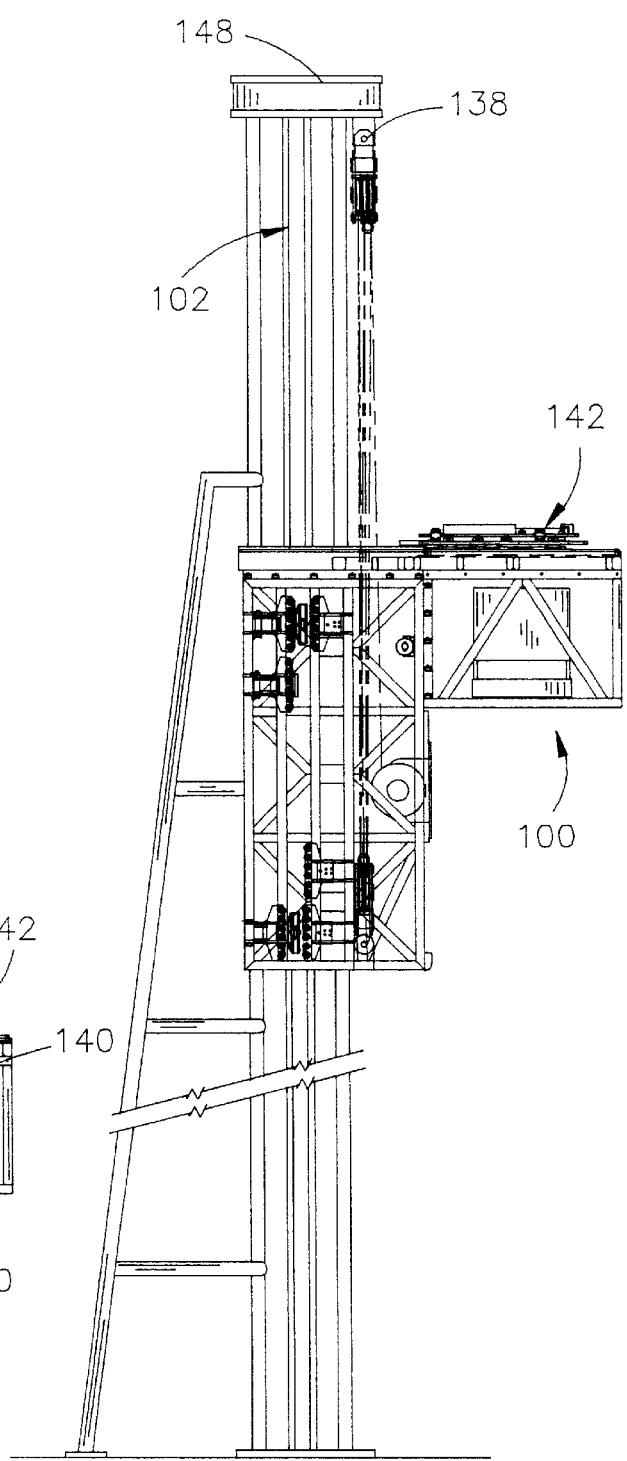
FIG. 31 is a view similar to FIG. 30 except that the sled has been partially raised on the tower.

In the embodiment of the sled illustrated in FIGS. 25, 30, 31 and 32, the sled is self-contained in that it has the winch and the power means mounted thereon. Accordingly, when it is desired to install a wind turbine on the top of a tower, the sled 100 is transported to the tower by means of a truck or trailer. As will be explained hereinafter, in the embodiment of the sled wherein the winch and power means is not mounted thereon, the sled 100 can be transported to the tower by means of a self-propelled vehicle 150, as will be described hereinafter. The sled 100 with the associated winch and power means could also be transported on the self-propelled vehicle if so desired. When the sled 100 has been transported to the tower, the sled is positioned as illustrated in FIG. 30 so that the sled 100 is positioned with respect to the tower, as illustrated in FIGS. 25, 30 and 33. The clamping apparatuses 120 and 122 are then positioned with respect to the guide rails 104 and 106, as previously described. The upper end of the block and tackle assembly 136 is then connected to the upper end of the tower 102 at 138, as illustrated in FIG. 30. The power means 140 is then energized and the winch 132 is operated so that the sled 100 is raised with respect to the tower 102. When the sled 100 has been raised to a predetermined position, a small crane is used to lift the wind turbine onto the platform 142 with the wind turbine being secured to the platform 142. If the rotor blades of the wind turbine have not been mounted on the wind turbine prior to the wind turbine being positioned on the platform 142, the rotor blades would be secured to the wind turbine at this time. It should be noted that the wind turbine is mounted on the platform 142 in a horizontally disposed position with the rotor blades being vertically disposed. When the wind turbine has been mounted on the platform 142, the winch 132 is operated to raise the sled 100 to the upper end of the tower 102, as seen in FIG. 32. When the sled 100 has been raised to the upper end of the tower 102, the platform 142 will be in the position illustrated in FIG. 33. The hydraulic cylinders 144 and 146 are then extended to move the platform 142 over the top of the tower 102. The wind turbine is then positioned on the turbine support structure at the upper end of the tower 102 and which is referred to by the reference numeral 148. After the wind turbine has been secured to the mounting structure 148, the platform 142 is moved from the position of FIG. 32 to the position of FIG. 34. The winch 132 is then operated to lower the sled 100 to the ground at which time the block and tackle assembly 136 may be disconnected from the upper end of the tower 102. The clamping apparatuses, which prevent lateral or horizontal movement of the sled 100 during the raising and lowering of the sled, are then released so that the sled 100 can be removed from the tower. The sled 100 may then be loaded onto a truck, trailer or the self-propelled vehicle 150 to be described hereinafter. The sled 100 may then be transported to another tower for use thereon.

Figure 35:
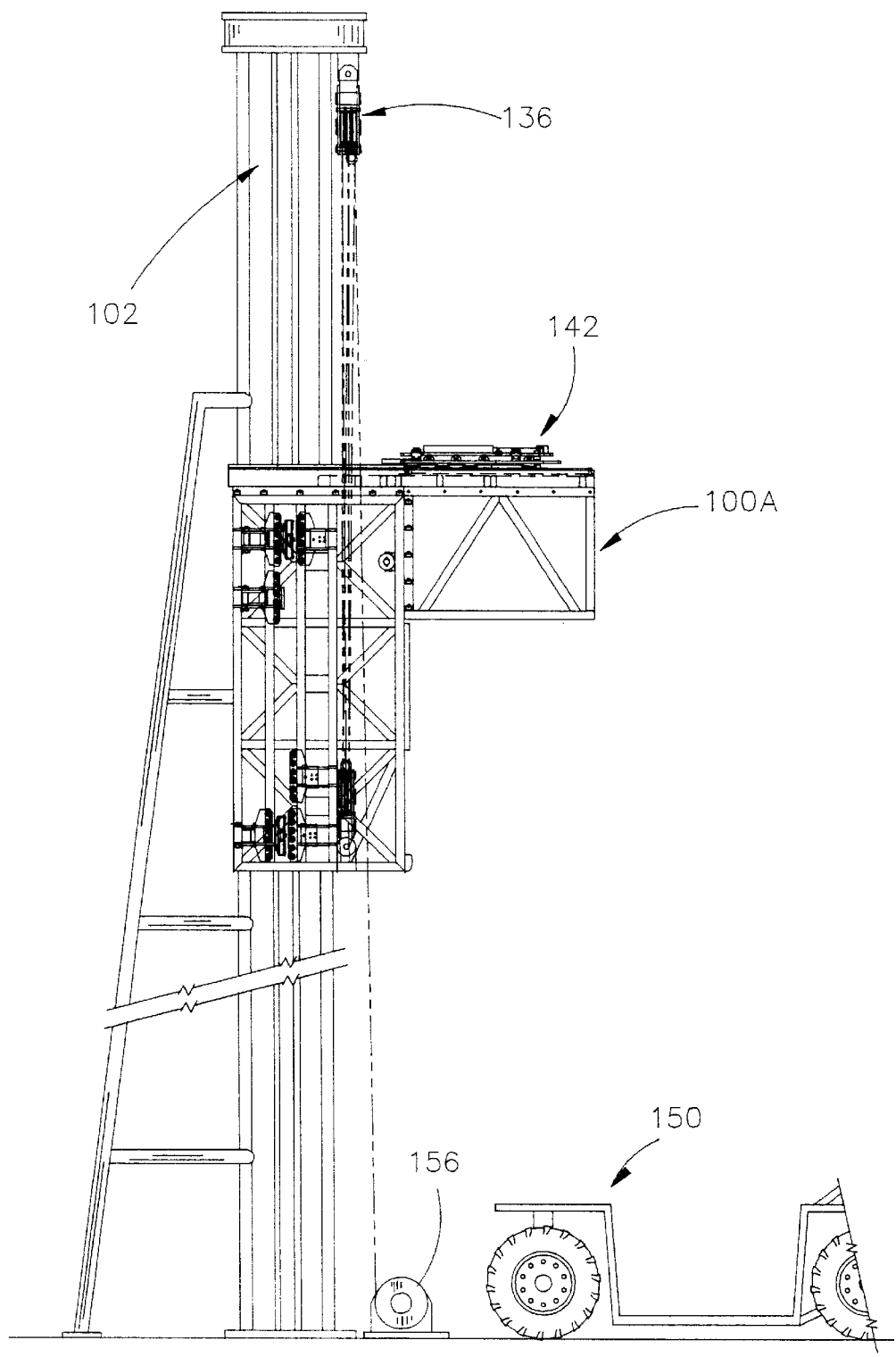
FIG. 35 is a side elevational view of a modified form of the sled of FIG. 31 wherein the winch and power means are not mounted on the sled.
Figure 36:
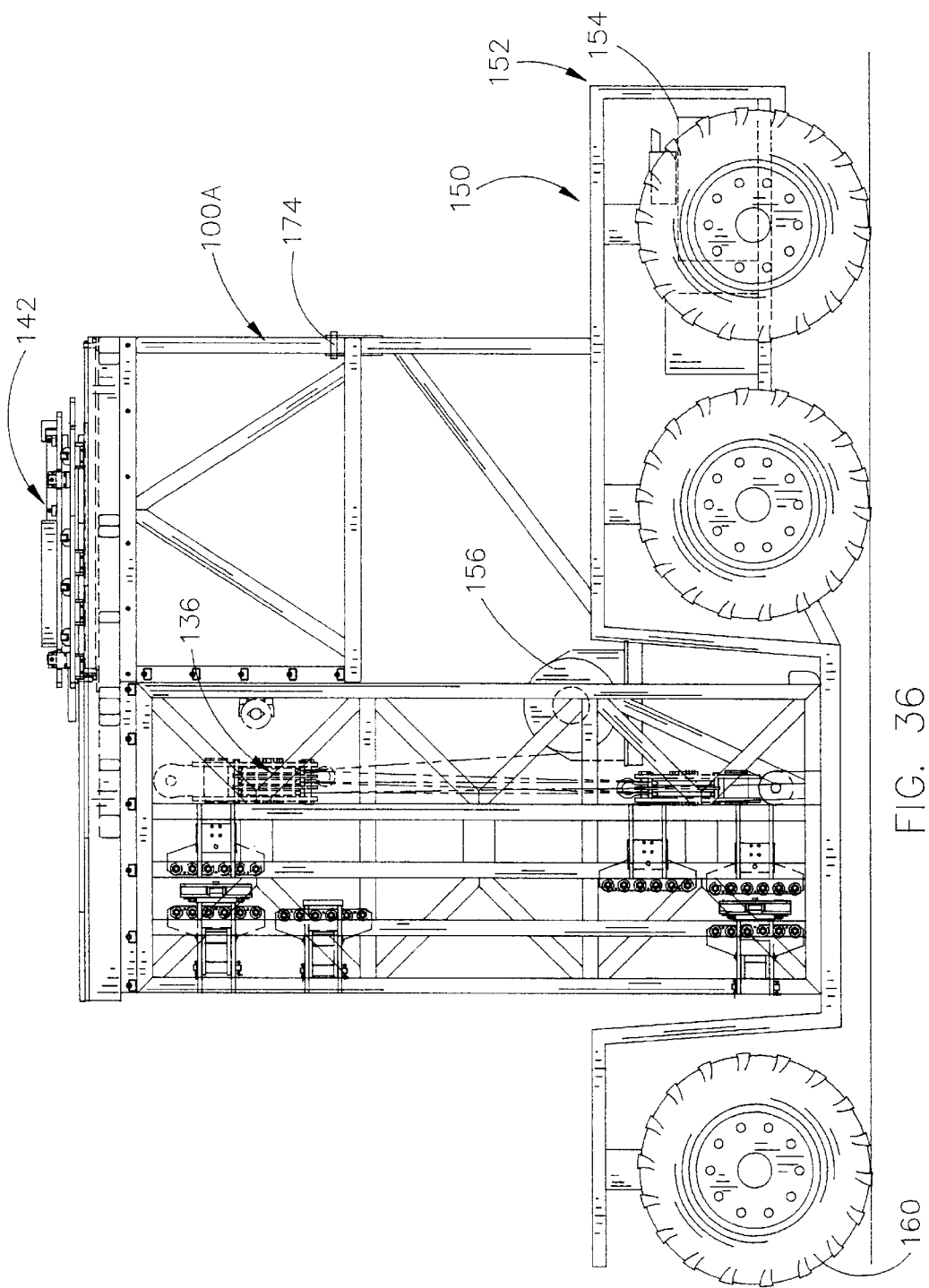
FIG. 36 is a side elevational view of a self-propelled vehicle which is used to transport the sled from one tower location to another.
Figure 37:
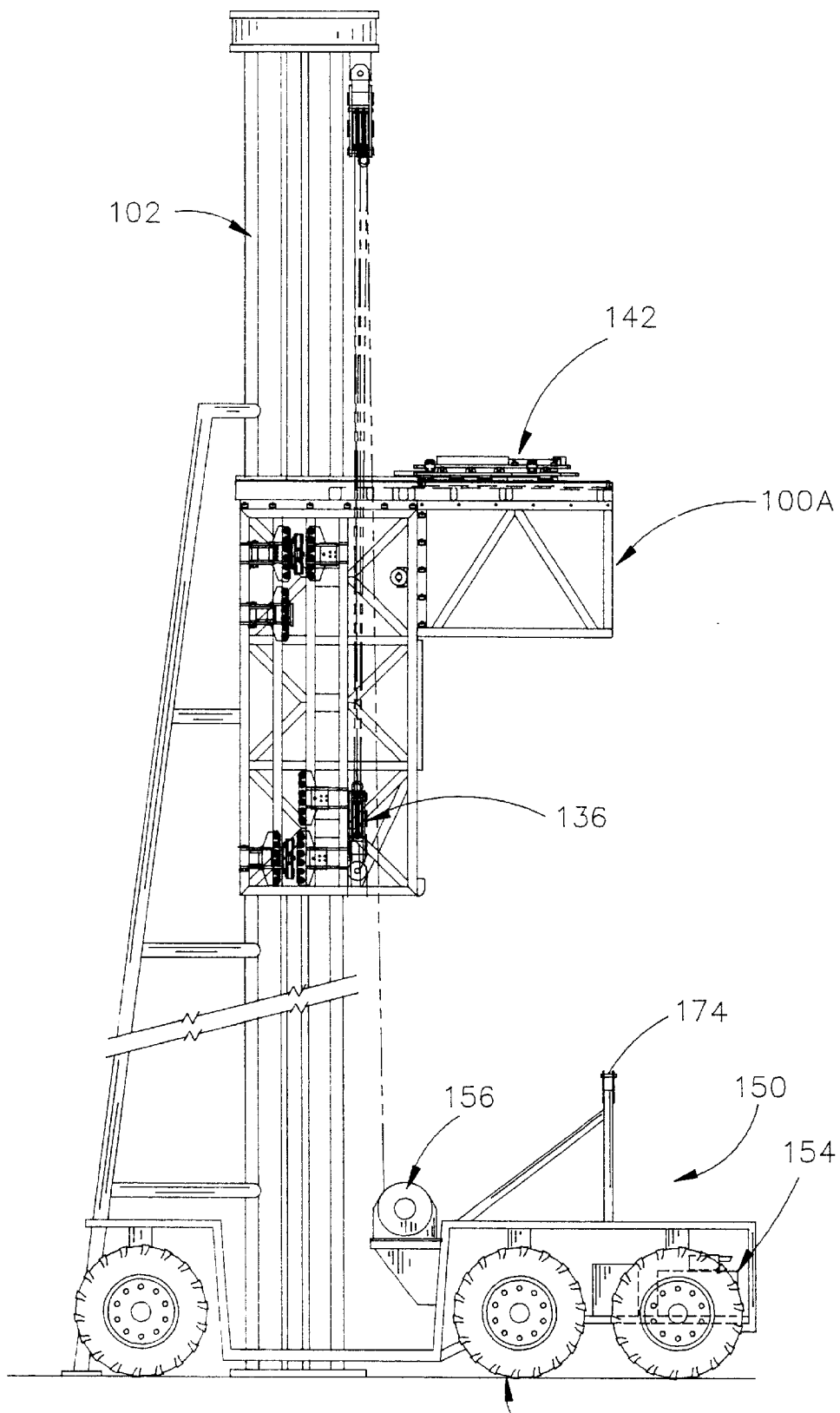
FIG. 37 is a view which illustrates the vehicle of FIG. 36 being positioned adjacent the tower with the sled having been raised upwardly on the tower.
Figure 38:
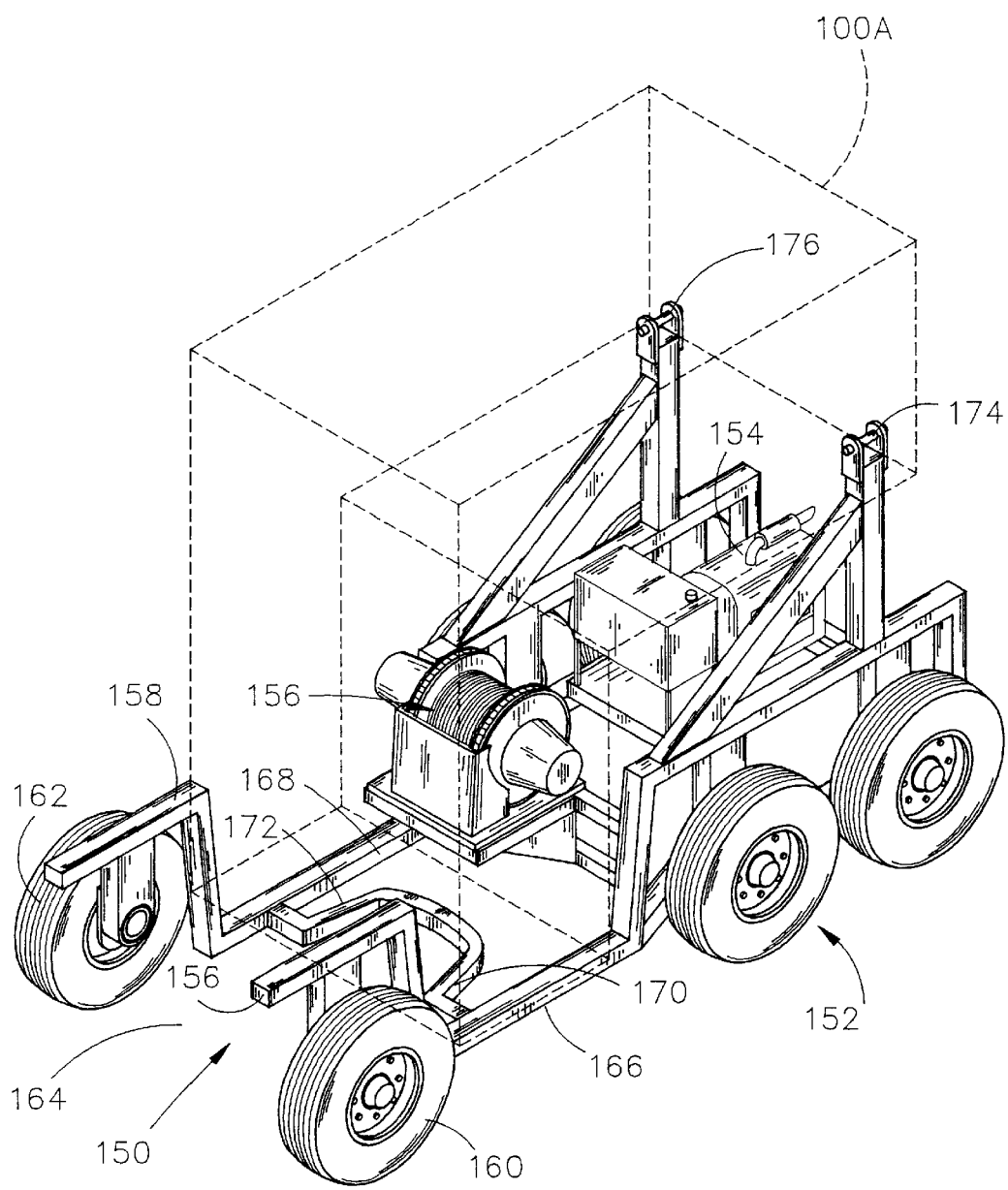
FIG. 38 is a front perspective view of the vehicle of FIGS. 36 and 37.

The self-propelled and steerable vehicle 150 referred to hereinabove is illustrated in FIGS. 36–38 and is partially illustrated in FIG. 35. Vehicle 150 includes a wheeled frame 152 having a power means 154 mounted thereon which not only drives the drive wheels of the vehicle 150 but which also operates the winch 156 which is mounted on the vehicle 150. The vehicle 150 is ideally suited for that embodiment of the sled generally referred to by the reference numeral 100A which is identical to sled 100 except that the power means and the winch are not mounted on the sled but are mounted on the vehicle 150.

The frame means 152 of vehicle 150 includes a pair of side frame members 156 and 158 which are supported by wheels 160 and 162, respectively, to define a space 164 therebetween. The frame members 156 and 158 include lower end portions 166 and 168 which are adapted to have the lower end of the sled 100A positioned thereon. Lower end portions 166 and 168 of frame members 156 and 158, respectively, include inwardly extending guide supports 170 and 172, respectively, which not only support the lower end of the sled 100A, but which also guide the vehicle 150 into position with respect to the tower 102.

When it is desired to mount a wind turbine on a tower, the sled 100 is loaded onto the vehicle 150 and is pinned thereto at 174 and 176. The vehicle 150 is then driven to the tower with the vehicle 150 being maneuvered so that the tower is received between the frame members 156 and 158. The guide supports 170 and 172 aid in properly positioning the vehicle 150 with respect to the tower 102. When the vehicle 150 has been properly positioned, the clamping apparatuses of the sled 100A are clamped onto the guide rails 104 and 106 in the same manner as previously described. At that time, the pins 174 and 176 will be released. The winch cable of the winch 156 will then be connected to the block and tackle assembly 136 with the upper end of the block and tackle 136 being secured to the upper end of the tower 102 in the same manner as previously described. Due to the weight of the sled and the turbine to be placed thereon, it is necessary that the vehicle 150 be anchored to the ground by any suitable means such as by anchor bolts, anchor straps, etc. The power means 154 is then operated to power the winch 156 which will raise and lower the sled 100A with respect to the tower 102 as previously described. The use of the self-propelled vehicle 150 eliminates the need for a large truck or trailer and provides a more convenient means of properly positioning the sled 100A with respect to the tower 102.

When the wind turbine has been mounted on the upper end of the tower 102, the sled 100A is lowered onto the vehicle 150 with the block and tackle assembly 136 then being disconnected from the tower. The clamping apparatuses which clamp the sled 100A to the tower 102 are also opened or released to enable the sled 100A to be moved away from the tower 102. Prior to movement of the vehicle 150, the sled 100A is again pinned to the vehicle 150 at 174 and 176.

If it is difficult to anchor the vehicle 150 to the ground, a solution to the problem is to disconnect the winch 156 from the vehicle 150 and anchor the winch 150 to the ground or a concrete footing by means of anchor bolts, anchor screws, etc. FIG. 35 illustrates the winch 156 having been disconnected from the vehicle 150 to eliminate the need of anchoring the entire vehicle to the ground or a suitable concrete footing or foundation. The power means 154 of the vehicle 150 will still be utilized to operate the winch 156, even though the winch 156 has been disconnected from the vehicle 150.

Thus it can be seen that a novel sled has been provided which is self-contained, that is, having its own power source and winch mounted thereon. It can also be seen that a novel self-propelled vehicle has been provided for transporting the sled from one location to another.

Thus it can be seen that the invention accomplishes at least all of its stated objectives.

We claim:

1. The method of mounting a wind turbine on the upper end of a vertically disposed wind turbine tower having upper and lower ends, comprising the steps of:

positioning a guide rail means on the tower which extends between the upper and lower ends thereof;

providing a self-propelled vehicle having a winch means mounted thereon and a power means mounted thereon which powers said vehicle and said winch means;

said winch means including a winch cable;

removably positioning a wind turbine support on said vehicle;

positioning said vehicle so that said wind turbine support is operatively positioned at the lower end of the tower for engagement with said guide rail means for subsequent movement to the upper end of the tower;

anchoring said winch means against vertical movement;

connecting said winch cable to said tower and said wind turbine support;

selectively operating said winch means to raise said wind turbine support and said wind turbine with respect to said tower to a position below the upper end of said tower;

mounting the wind turbine on said wind turbine support;

operating said winch means to raise said wind turbine support and the wind turbine to the upper end of said tower;

securing the wind turbine to the upper end of the tower;

moving said wind turbine support along said guide rail means to the lower end of the tower;

and removing said wind turbine support from said tower and positioning said wind turbine support on said vehicle.

2. The method of claim 1 wherein said vehicle having the wind turbine support mounted thereon, after the wind turbine support has been removed from the tower, is driven to another tower location for use therewith.

3. The method of claim 1 wherein said vehicle is anchored against vertical movement prior to said wind turbine support being moved vertically on the tower.

4. The method of claim 1 wherein said winch means is anchored against vertical movement prior to said wind turbine support being moved vertically on the tower.

5. The method of claim 4 wherein said winch means is removed from said vehicle prior to said winch means being anchored against said vertical movement.

6. The method of claim 1 wherein said winch means is anchored against vertical movement by anchoring said vehicle to the ground.

7. The method of claim 1 wherein said guide rail means comprises a pair of guide rails positioned on opposite sides of the tower and wherein said wind turbine support is selectively clamped onto said guide rails.

* * * * *

UNITED STATES PATENT AND TRADEMARK OFFICE
CERTIFICATE OF CORRECTION

PATENT NO.     : 6,505,785 B2
DATED          : January 14, 2003
INVENTOR(S)    : Jeffrey O. Willis, Anthony J. Hansen and Mark J. Perina It is certified that error appears in the above-identified patent and that said Letters Patent is hereby corrected as shown below:

Column 10,
Line 30, after "selectively operating said winch means to raise said wind turbine support" please delete -- and said wind turbine --.

Signed and Sealed this

Eleventh Day of March, 2003

JAMES E. ROGAN
*Director of the United States Patent and Trademark Office*